United States Patent
Luft et al.

(10) Patent No.: US 7,209,436 B1
(45) Date of Patent: Apr. 24, 2007

(54) METHOD AND APPARATUS FOR VARIABLE RATE PIPES

(75) Inventors: Siegfried Luft, Vancouver (CA); Gerald Neufeld, Los Altos, CA (US); David Stiles, Los Gatos, CA (US)

(73) Assignee: Redback Networks Inc., San Jose, CA (US)

( * ) Notice: Subject to any disclaimer, the term of this patent is extended or adjusted under 35 U.S.C. 154(b) by 999 days.

(21) Appl. No.: 09/887,299

(22) Filed: Jun. 22, 2001

Related U.S. Application Data

(60) Provisional application No. 60/258,765, filed on Dec. 30, 2000.

(51) Int. Cl.
*H04B 10/20* (2006.01)
*H04J 14/08* (2006.01)
*H04L 12/437* (2006.01)

(52) U.S. Cl. .................. 370/222; 370/404; 398/3; 398/5; 398/59

(58) Field of Classification Search ............ 370/222, 370/404; 398/3, 5, 59
See application file for complete search history.

(56) References Cited

U.S. PATENT DOCUMENTS

| | | | |
|---|---|---|---|
| 4,736,393 A | 4/1988 | Aubin et al. | |
| 5,159,595 A | 10/1992 | Flanagan et al. | |
| 5,537,393 A | 7/1996 | Shioda et al. | |
| 5,600,631 A | 2/1997 | Takatori et al. | |
| 5,719,858 A | 2/1998 | Moore | |
| 5,764,392 A | 6/1998 | Van As et al. | |
| 5,933,258 A | 8/1999 | Flanagan et al. | |
| 5,986,783 A | 11/1999 | Sharma et al. | |
| 6,009,075 A | 12/1999 | Roberts et al. | |
| 6,163,527 A | 12/2000 | Ester et al. | |
| 6,222,848 B1 | 4/2001 | Hayward et al. | |
| 6,249,510 B1 | 6/2001 | Thompson | |
| 6,259,837 B1 * | 7/2001 | de Boer et al. | 385/24 |
| 6,296,452 B1 | 10/2001 | Caren | |
| 6,400,859 B1 * | 6/2002 | de Boer et al. | 385/24 |
| 6,442,694 B1 | 8/2002 | Bergman et al. | |

(Continued)

FOREIGN PATENT DOCUMENTS

WO  PCT/US01/49822  12/2001

(Continued)

OTHER PUBLICATIONS

S. Keshav, An Engineering Approach to Computer Networking ATM Networks, the Internet, and the Telephone Network, Chapter 8: Switching, pp. 159-175, Apr. 1997, Addison-Wesley Professional Computing Series.

(Continued)

*Primary Examiner*—Alpus H. Hsu
(74) *Attorney, Agent, or Firm*—Blakely, Sokoloff, Taylor & Zafman LLP

(57) ABSTRACT

A method and apparatus for variable rate pipes is described. In one embodiment of the invention, a computer implemented method comprises allocating a pipe from part of a working channel and at least part of a protecting channel of a span of a bi-directional line switched ring (BLSR), the pipe having a bandwidth, transmitting a set of layer 2/3 traffic in the pipe, and reducing the pipe's bandwidth when a failure occurs in the ring.

62 Claims, 15 Drawing Sheets

U.S. PATENT DOCUMENTS

| | | | |
|---|---|---|---|
| 6,594,279 | B1 | 7/2003 | Nguyen et al. |
| 6,606,667 | B1 | 8/2003 | Hermann |
| 6,616,350 | B1 | 9/2003 | de Boer et al. |
| 6,628,649 | B1 | 9/2003 | Raj et al. |
| 6,654,354 | B1 | 11/2003 | Watkins et al. |
| 6,658,457 | B2 | 12/2003 | Nishikawa et al. |
| 6,683,891 | B1 | 1/2004 | Mazzurco et al. |
| 6,725,401 | B1 | 4/2004 | Lindhorst-Ko |
| 6,765,916 | B1 | 7/2004 | Duvvuru et al. |
| 6,775,477 | B2 | 8/2004 | Badr |
| 6,782,000 | B2 | 8/2004 | Subramanian et al. |
| 6,785,224 | B2 | 8/2004 | Uematsu et al. |
| 6,795,394 | B1 | 9/2004 | Swinkels et al. |
| 6,810,011 | B1 * | 10/2004 | Betts .................... 370/228 |
| 6,920,113 | B1 * | 7/2005 | Kovvali et al. ............ 370/255 |
| 6,925,054 | B1 | 8/2005 | Atterton et al. |
| 6,934,248 | B1 | 8/2005 | DeBoer et al. |
| 6,940,808 | B1 * | 9/2005 | Shields et al. ............ 370/216 |
| 6,977,889 | B1 | 12/2005 | Kawaguchi et al. |
| 2002/0080437 | A1 | 6/2002 | Sparks et al. |
| 2002/0118636 | A1 | 8/2002 | Phelps et al. |
| 2002/0141334 | A1 * | 10/2002 | Deboer et al. ............ 370/227 |
| 2002/0167966 | A1 | 11/2002 | Coltro |
| 2004/0202467 | A1 | 10/2004 | Luft et al. |

FOREIGN PATENT DOCUMENTS

| | | |
|---|---|---|
| WO | PCT/US01/50012 | 6/2002 |
| WO | PCT/US01/50012 | 9/2002 |
| WO | PCT/US01/50012 | 12/2002 |

OTHER PUBLICATIONS

S. Keshav, An Engineering Approach to Computer Networking ATM Networks, the Internet, and the Telephone Network, Chapter 15: Common Protocols, pp. 502-505, Apr. 1997, Addison-Wesley Professional Computing Series.

S. Keshav, An Engineering Approach to Computer Networking ATM Networks, the Internet, and the Telephone Network, Chapter 15: Common Protocols, pp. 512-517, Apr. 1997, Addison-Wesley Professional Computing Series.

Howard C. Berkowitz, Designing Routing and Switching Architectures for Enterprise Networks, Chapter 9: Connection-Oriented Switching, pp. 507-511, 1999, Network Architecture and Development Series, MacMillan Technical Publishing.

SONET NE View Requirements and Information Model, SIF Approved Document, SIF Document No. SIF-IM-9803-049R10, Information Modeling Group, Apr. 29, 1999.

Synchronous Optical Network (SONET)-Automatic Protection Switching, American National Standard for Telecommunications, ANSI T1.105.01-2000, Mar. 23, 2000.

Synchronous Optical Network (SONET)-Basic Description including Multiplex Structure, Rates, and Formats, American National Standard for Telecommunications, ANSI T1.105-1995, Oct. 27, 1995.

Series G: Transmission Systems and Media, Digital Systems and Networks, Architecture of transport networks based on the synchronous digital hierarchy (SDH), ITU-T Recommendation G.803, Mar. 2000.

* cited by examiner

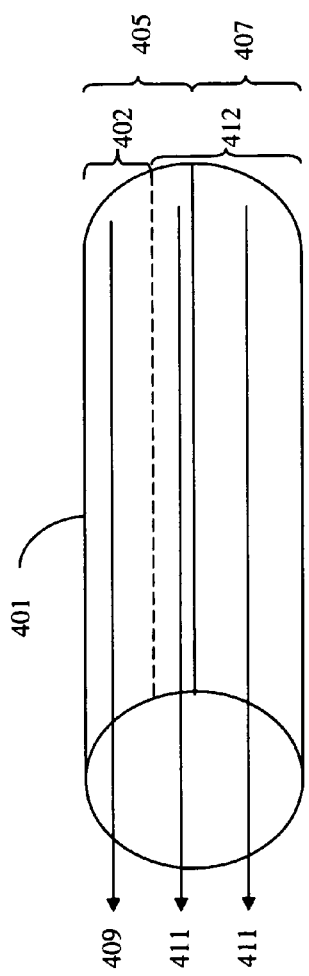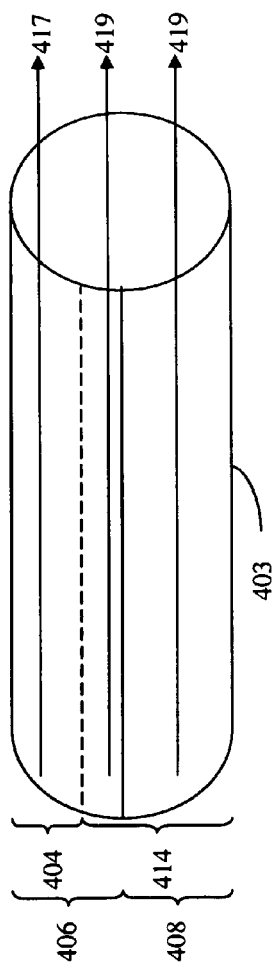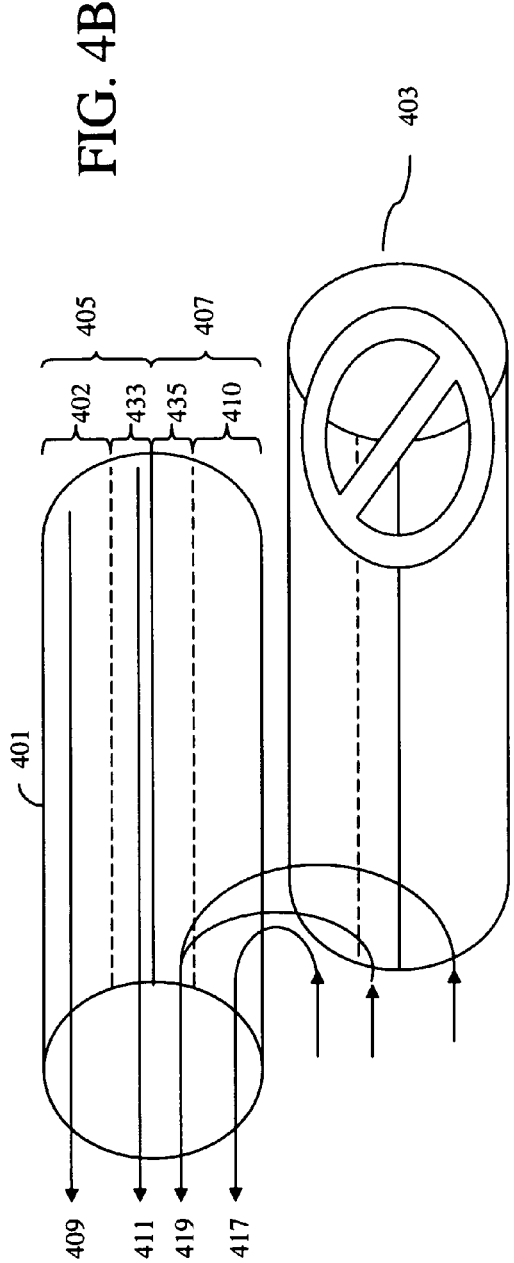

METHOD AND APPARATUS FOR VARIABLE RATE PIPES

CROSS-REFERENCE TO RELATED APPLICATIONS

This application claims the benefit of U.S. Provisional Patent Application No. 60/258,765, entitled "Method and Apparatus for Variable Rate Pipes" filed on Dec. 30, 2000.

BACKGROUND OF THE INVENTION

1. Field of the Invention

This invention relates to communication networks. More specifically, the present invention relates to communication over optical networks.

2. Description of the Related Art

Current networks must satisfy consumer demand for more bandwidth and a convergence of voice and data traffic. The increased demand of bandwidth by consumers combines with improved high bandwidth capacity of core networks to make edge networks a bottleneck despite the capacity of optical networks.

Multiplexing is used to deliver a variety of traffic over a single high speed broadband line. An optical standard such as Synchronous Optical Network (SONET) or Synchronous Digital Hierarchy (SDH) in conjunction with a multiplexing scheme is used to deliver various rates of traffic over a single high speed optical fiber. SONET/SDH is a transmission standard for optical networks which corresponds to the physical layer of the open standards institutes (OSI) network model. One of the protection schemes for SONET/SDH involves automatic protection switching (APS) in a bi-directional line switched ring (BLSR) architecture. BLSR utilizes linear switching to implement APS.

FIGS. 1A–1E are diagrams illustrating an example of traffic flow in a Bi-Directional Line Switched Ring (BLSR) while there is and is not a failure in the ring. FIG. 1A (Prior Art) is a diagram of exemplary traffic flow on the ring while there is not a failure. Although a BLSR has a working channel and a protection channel for traffic flowing East and West, only one working channel and its protection channel (which traverses the ring in the opposite direction) are shown in FIGS. 1A and 1B. In FIG. 1A, a stream of traffic 113 is received from a source external to the ring at node 101. Node 101 transmits this traffic 113 over its East span 115 on a working channel 119 to a node 103. Node 103 transmits the traffic 113 over its East span 117 in a working channel 121 to node 105. The stream of TDM traffic 113 exits the ring at node 105 to a destination external to the ring. Although extra traffic may be flowing in the protection channels of the ring, only the stream of TDM traffic 113 is shown for simplicity.

FIG. 1B (Prior Art) is a diagram of exemplary traffic flow on the ring while there is a failure. In FIG. 1B, the node 103's East span 117 has failed (e.g. severed lines). The stream of TDM traffic 113 is protection switched at node 103. Node 103 informs the other nodes in the ring of the failure. The stream of TDM traffic 113 is transmitted back to node 101 from node 103 in the protection channel 110 of node 103's West span 115. The stream of TDM traffic 113 continues around the ring to node 105 along a protection path. The protection path includes the protection channels 114, 120, 128, and 120 carrying traffic between nodes 101 and 107, 107 and 109, 109 and 111, and 111 and 105, respectively.

FIG. 1C (Prior Art) is a diagram of exemplary traffic flow on the ring while there is not a failure. In FIG. 1C, transmit working and protection channels 137, 110 and receive working and protection channels 119, 139 of node 103's West span 115 are shown. Similarly, transmit working and protection channels 121, 135 and receive working and protection channels 141, 143 of node 103's East span 117 are shown. The transmit working channel 137 and the receive protection channel 139 of node 103's West span 115 are not shown in FIGS. 1A and 1B for simplicity. The transmit protection channel 135 and the receiving working channel 141 of node 103's East span 117 are also not shown in FIGS. 1A and 1B for simplicity. A stream of working TDM traffic 104 is transmitted in the transmit working channel 137 from node 103 to node 101. Another stream of working TDM traffic 113 is received in the receive working channel 119 and transmitted to node 105 in the transmit working channel 121 while there is not a failure. The receive working channel 141 carries TDM traffic not shown in the figure.

FIG. 1D (Prior Art) is a diagram of exemplary traffic flow on the ring while there is a failure. In FIG. 1D, the stream of working TDM traffic 104 continues to be transmitted in the transmit working channel 137. The stream of TDM traffic 113 is protection switched to the transmit protection channel 110 while there is a failure.

The ring described in FIGS. 1A–1D can be a 2 fiber or 4 fiber BLSR. The channels described in FIGS. 1A–1D are logical channels which may reside on different optical fibers depending on the ring architecture. A ring switch, which is a protection switch that occurs in both 2 fiber and 4 fiber BLSRs, is illustrated in FIGS. 1C–1D.

FIG. 1E (Prior Art) is a diagram illustrating a span switch while the transmit working channel 121 of FIGS. 1C–1D fails. In FIG. 1E, the transmit working channel 121 of node 103 fails. In a 4 fiber optical ring, the failure is detected and the stream of TDM traffic 113 is span switched to the transmit protection channel 135. A span switch is a protection switch which occurs in a 4 fiber BLSR. Physically, the East span 117 is 2 fibers. The transmit working channel 121 exists on one fiber and the transmit protection channel 135 exists on a separate fiber. The failure of the working channel 121 is a failure of the first fiber. The stream of TDM traffic 113 is switched from being transmitted over the first fiber to being transmitted over the second fiber.

High speed optical rings offer large amounts of bandwidth, but the protection scheme utilizes 50% of that bandwidth. This 50% of total bandwidth for a protection channel often goes unused while there is not a failure. It is often unused because traffic transmitted in the protection channel would be preempted by the working TDM traffic while a failure occurs.

FIGS. 2A and 2B are diagrams illustrating the use of a protection channel to carry extra time division multiplexed (TDM) traffic while there is and is not a failure. FIG. 2A (Prior Art) is a diagram illustrating the use of a protection channel to carry extra TDM traffic while there is not a failure. In FIG. 2A, a West span 201 is divided into a working channel 205 and a protection channel 207. The working channel 205 carries TDM traffic 209 and the protection channel 207 carries extra TDM traffic 211. An East span 203 is also divided into a working channel 204 and a protection channel 206. The working channel 204 of the East span 203 carries TDM traffic 213 and the protection channel 206 carries extra TDM traffic 215.

FIG. 2B (Prior Art) illustrates preemption of extra TDM traffic while there is a failure. In FIG. 2B, the East span 203 has failed. The working TDM traffic 213 is protection switched into the protection channel 207 of the West span 201. The protection switched working TDM traffic 213 preempts the extra TDM traffic 211 which was previously carried in the protection channel 207 of the West span 201. The extra TDM traffic 215 previously transmitted over the protection channel 207 of the East span 203 is not protected and is therefore completely lost upon the failure. The extra TDM traffic is problematic to sell to customers because it is preemptable and unprotected. A consumer could purchase the extra traffic service from two network owners or providers and alternate between the two upon failures. While the above is true for a 2 fiber BLSR, the impact to extra TDM traffic in a 4 fiber BLSR depends on the type of failure. In particular, while a ring switch in 4 fiber BLSR operates in a similar manner as described above, a span switch in a 4 fiber BLSR does not impact the extra TDM traffic transmitted on the non-failing spans.

SUMMARY OF THE INVENTION

The invention provides a method and apparatus for provisioning a variable rate layer 2/3 traffic pipe and a constant rate optically switched traffic pipe. According to one aspect of the invention, a method is provided which allocates a segment of bandwidth of an optical span for a variable rate layer 2/3 traffic pipe.

According to one embodiment of the invention, a first set of timeslots are configured as a working channel and a second set of timeslots are configured as a protection channel in a bi-directional line switched ring (BLSR). A subset of the first set of timeslots and a subset of the second set of timeslots are allocated for a variable rate layer 2/3 traffic pipe. A second subset of the first set of timeslots are allocated for a working optically switched traffic pipe. Upon a failure in the BLSR, the variable rate layer 2/3 traffic pipe is reduced to a working layer 2/3 pipe, the subset of the second set of timeslots becomes a protecting layer 2/3 traffic pipe, and a second subset of the second set of timeslots becomes a protecting optically switched traffic pipe.

These and other aspects of the present invention will be better described with reference to the Detailed Description.

BRIEF DESCRIPTION OF THE DRAWINGS

The invention may best be understood by referring to the following description and accompanying drawings that are used to illustrate embodiments of the invention. In the drawings:

FIG. 4A is a diagram illustrating an example traffic flow while there is not a failure in an optical span according to one embodiment of the invention.

FIG. 4B is a diagram illustrating an example traffic flow while there is a failure in an optical span according to one embodiment of the invention.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

A method and apparatus is described that provides a pipe through an optical ring network that includes some bandwidth from the working and protection channels while there is no failure, but that is not completely lost on a failure. In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, IP, etc. In addition to typical operations of TDM network elements, the network elements are implemented to be able to: 1) programmably select on an STS basis certain of the incoming TDM traffic to be extracted and packet switched rather than TDM switched; and/or 2) receive packet traffic in another form and to be packet switched. Regardless of which switching technique is used, the switched traffic going back onto the ring is put in TDM format and transmitted out. However, each time traffic is packet switched, that traffic can be statistically multiplexed (e.g., the packets can be selectively dropped based on various criteria). An exemplary implementation of such hybrid network elements is provided in FIG. 5.

Figure 1A:
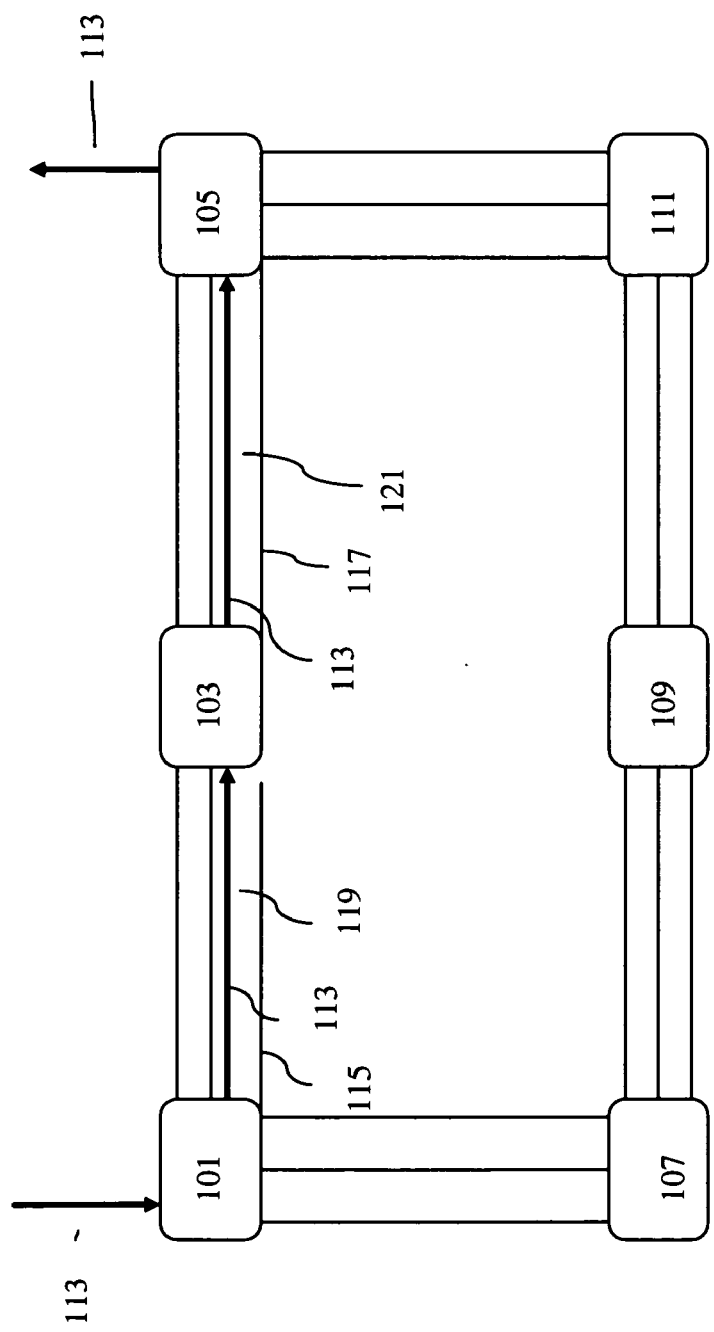
FIG. 1A (Prior Art) is a diagram of exemplary traffic flow on the ring while there is not a failure.
Figure 1B:
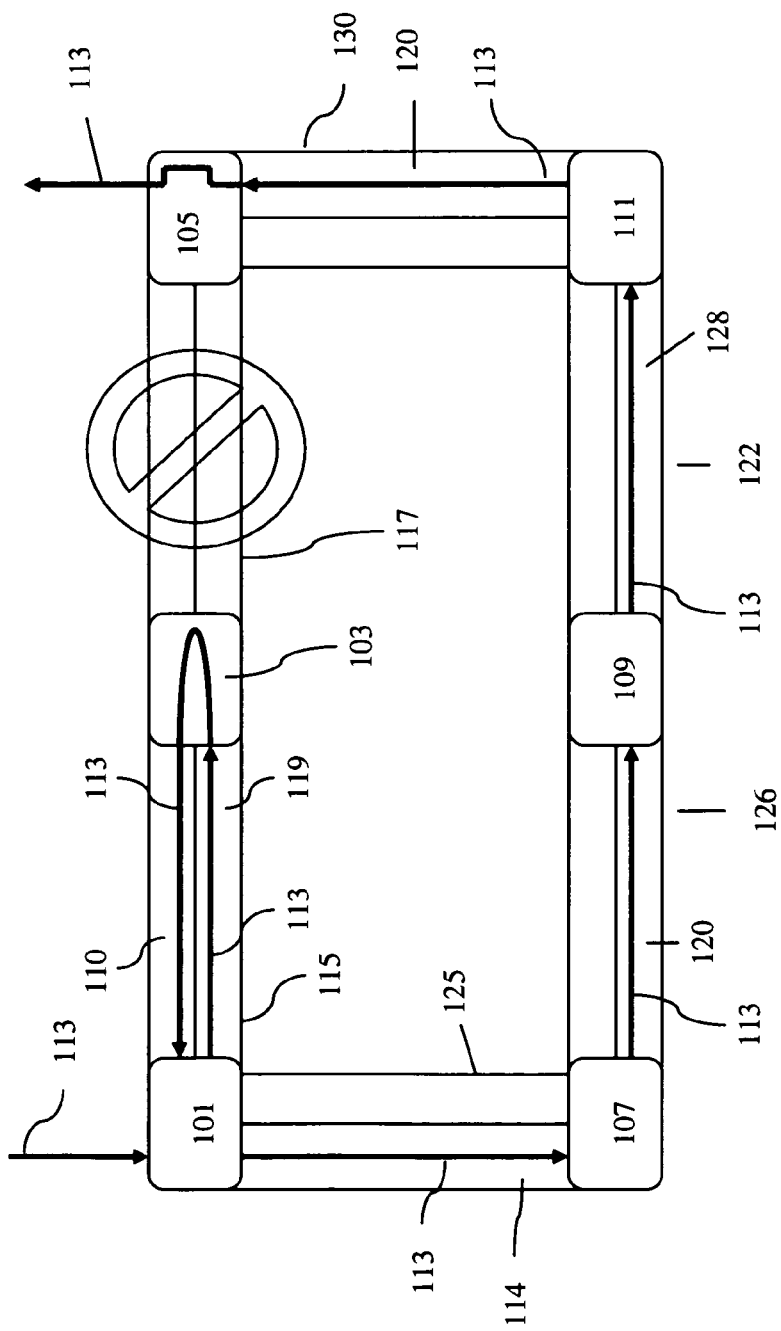
FIG. 1B (Prior Art) is a diagram of exemplary traffic flow on the ring while there is a failure.
Figure 1C:
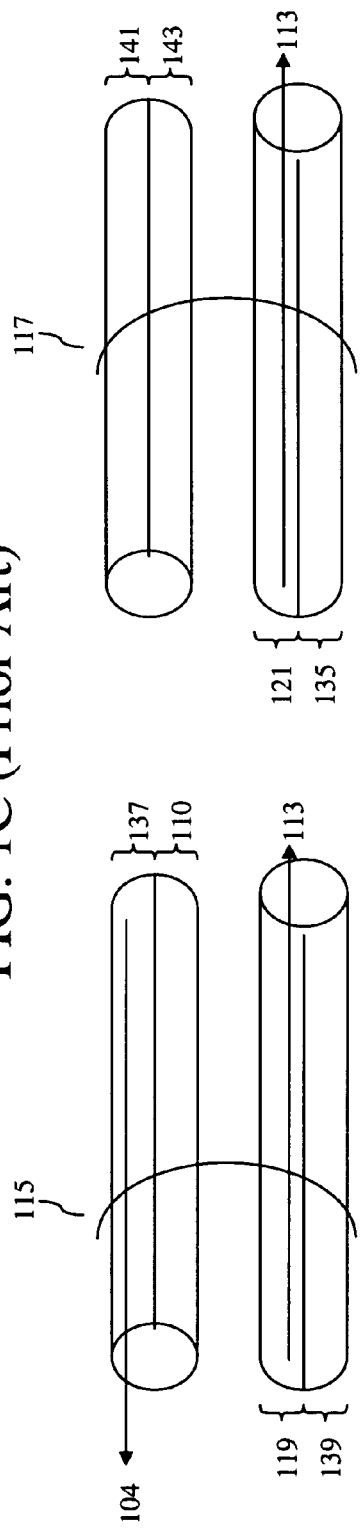
FIG. 1C (Prior Art) is a diagram of exemplary traffic flow on the ring while there is not a failure.
Figure 1D:
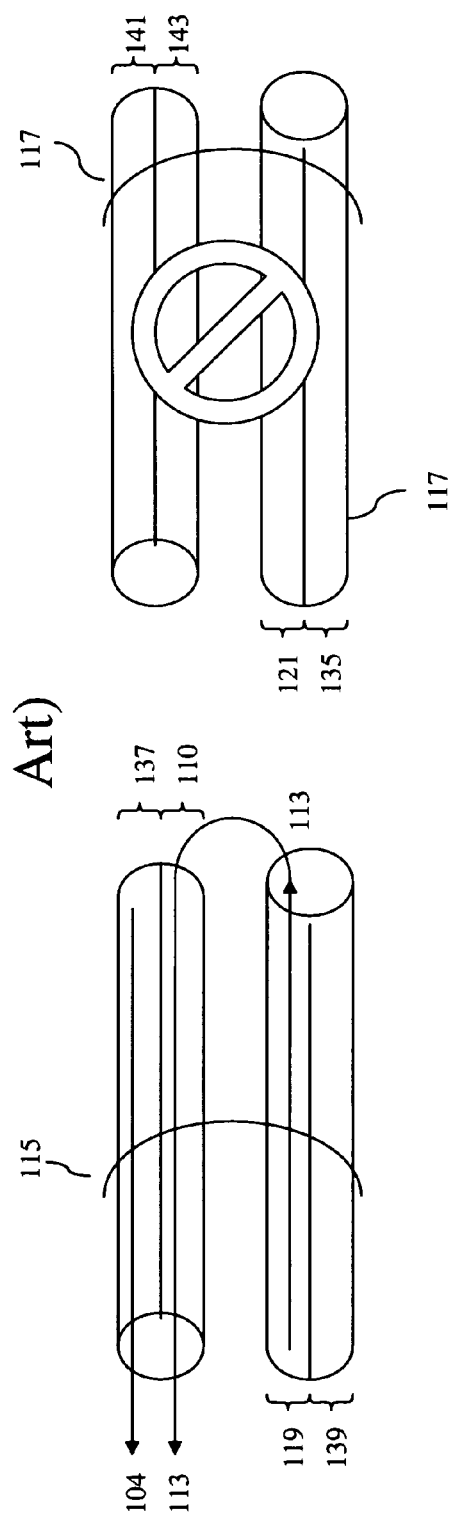
FIG. 1D (Prior Art) is a diagram of exemplary traffic flow on the ring while there is a failure.
Figure 1E:
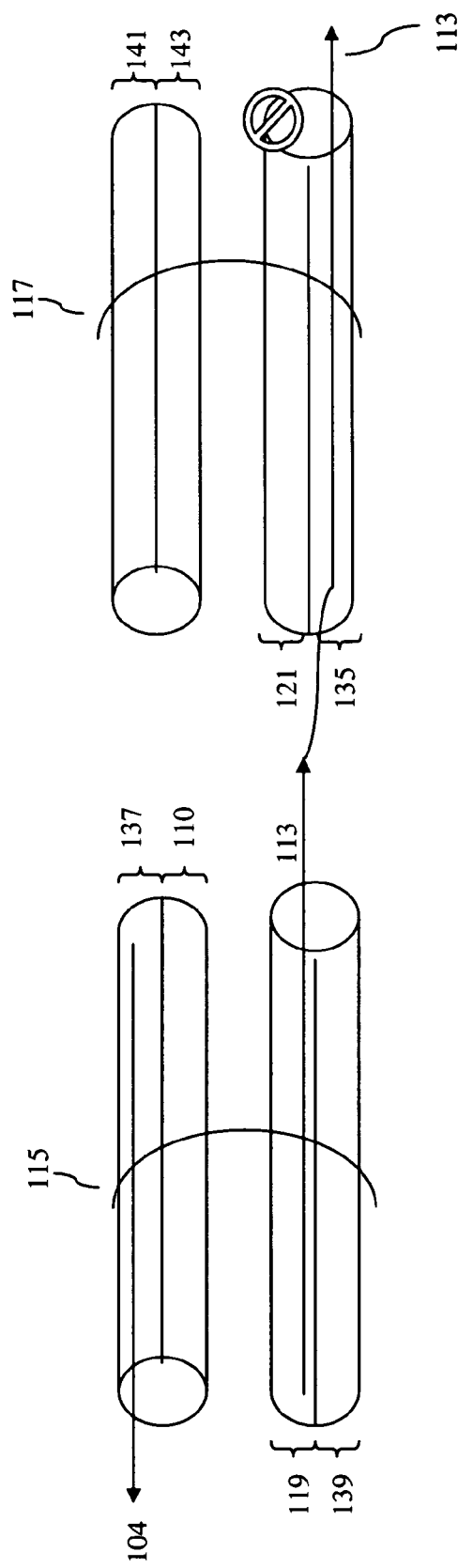
FIG. 1E (Prior Art) is a diagram illustrating a span switch while the transmit working channel 121 of FIGS. 1C–1D fails.
Figure 2A:
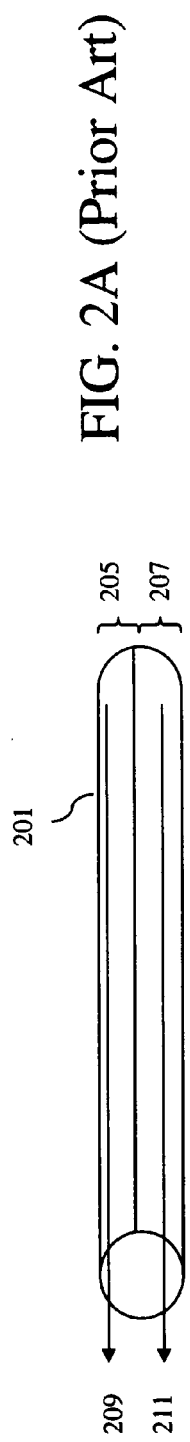
FIG. 2A (Prior Art) is a diagram illustrating the use of a protection channel to carry extra TDM traffic while there is not a failure.
Figure 2A:
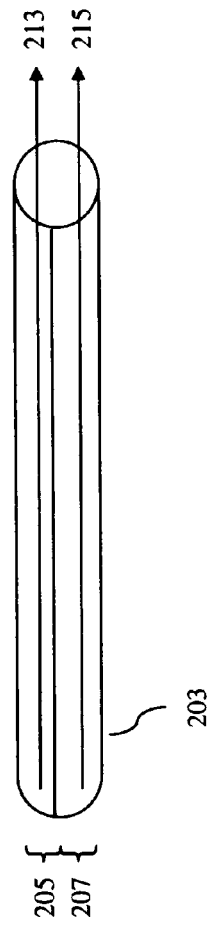
Figure 2B:
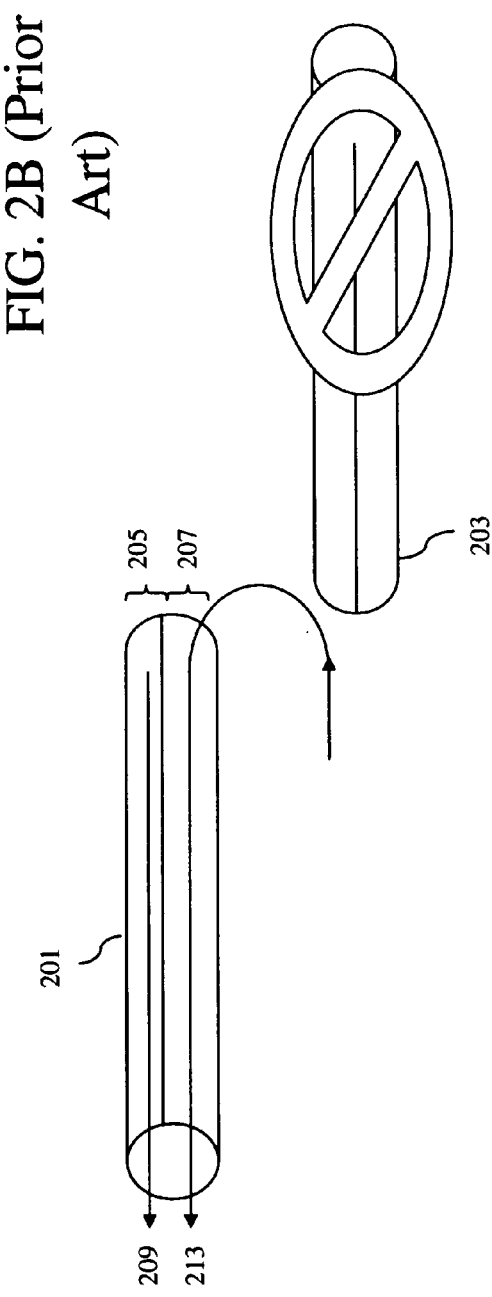
FIG. 2B (Prior Art) illustrates preemption of extra TDM traffic while there is a failure.
Figure 3:
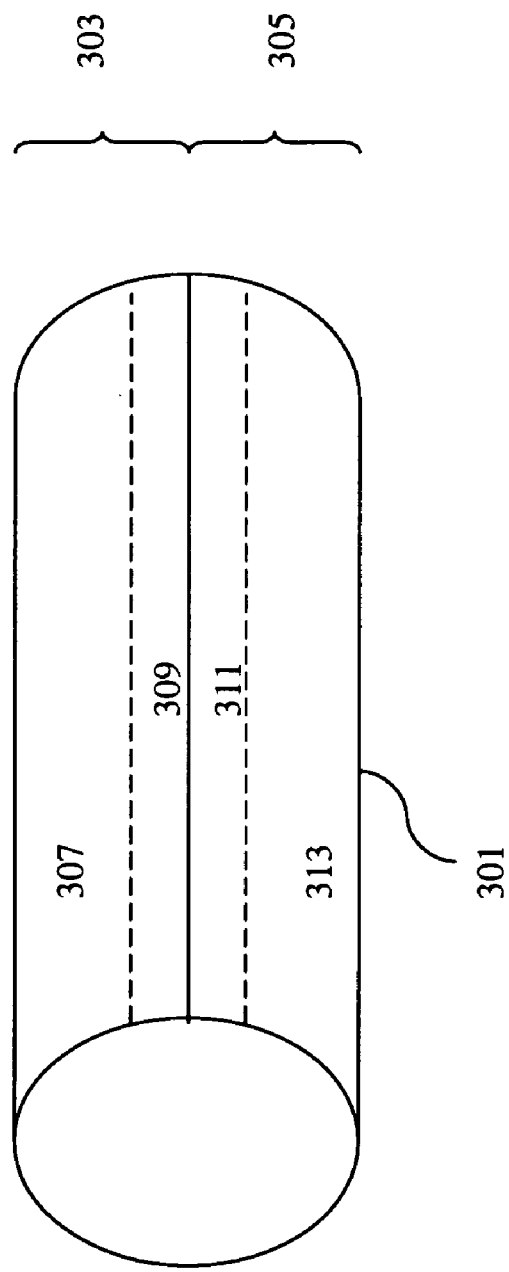
FIG. 3 is a conceptual diagram illustrating an exemplary division of an optical span's bandwidth according to one embodiment of the invention.

FIG. 3 is a conceptual diagram illustrating an exemplary division of an optical span's bandwidth according to one embodiment of the invention. In FIG. 3, the optical span's

301 bandwidth is evenly split between a working channel 303 and a protection channel 305. A segment of bandwidth 307 in the working channel 303 will carry TDM traffic. This segment of bandwidth 307 will be referred to as the working TDM pipe. While there is not a failure, the remaining bandwidth 309 of the working channel 303 forms a subpipe, all of the protection channel 305 forms a subpipe, and together these subpipes form a layer 2/3 pipe to transmit TDM traffic having layer 2/3 traffic (ATM, Ethernet, Frame Relay, Internet Protocol, etc.) as payload. While there is a failure, the segment of bandwidth 313 of the protection channel 307 will carry a protection switched stream of TDM traffic. The segment of bandwidth 311 of the protection channel 307 will be used as a protecting layer 2/3 subpipe to carry another stream of protection switched TDM traffic. The segment of bandwidth or working layer 2/3 subpipe 309 of the working channel 303 will carry the TDM traffic having layer 2/3 traffic as payload transmitted in the layer 2/3 pipe while there is not a failure.

Figure 4C:
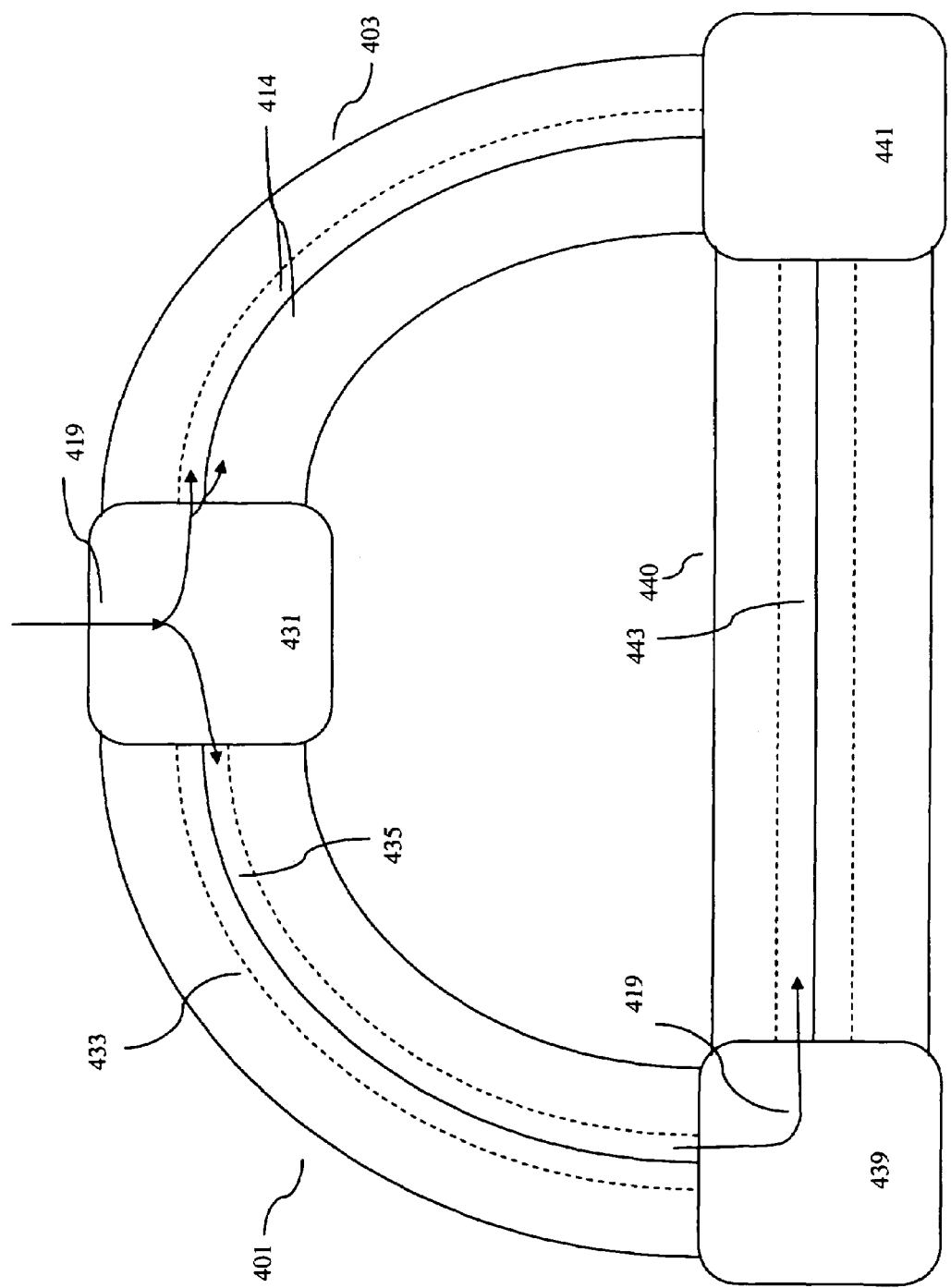
FIG. 4C is a diagram of the example traffic flow 419 of FIGS. 4A and 4B while there is not and is a failure of the span 403 of FIGS. 4A an 4B in a ring according to one embodiment of the invention.

FIGS. 4A–4C are diagrams illustrating example traffic flow while there is and is not a failure on an optical span according to one embodiment of the invention. FIG. 4A is a diagram illustrating an example traffic flow while there is not a failure in an optical span according to one embodiment of the invention. In FIG. 4A, a West transmit span 401 is divided into a working channel 405 and a protection channel 407. In FIG. 4A, the West transmit span 401 carries two streams of traffic. In a working TDM pipe 402 the West transmit span 401 carries a stream of TDM traffic 409. The West transmit span 401 carries another stream of TDM traffic 411 having layer 2/3 traffic as payload in a layer 2/3 pipe 412. The stream of TDM traffic 411 is represented by two lines to show the layer 2/3 pipe 412 encompassing a segment of the working channel 405 and all of the protection channel 407 (it should be noted that the layer 2/3 pipe need not encompass all of the protection channel 407—some of this channel could go unused and/or some of this channel could be used for a different purpose, e.g., extra traffic).

In FIG. 4A, an East transmit span 403 is also divided into a working channel 406 and a protection channel 408. The East transmit span 403 carries two streams of traffic. In a working TDM pipe 404 the East transmit span 403 carries a stream of TDM traffic 417. The East transmit span 403 carries another stream of TDM traffic 419 having layer 2/3 traffic as payload in a layer 2/3 pipe 414. The stream of TDM traffic 419 is represented by two lines to show the layer 2/3 pipe 414 encompassing a segment of the working channel 406 and all of the protection channel 408 (again, it should be noted that the layer 2/3 pipe need not encompass all of the protection channel 407).

The streams of TDM traffic 411 and 419 carry data traffic formatted according to a layer 2/3 protocol such as ATM, Ethernet, Frame Relay, Internet Protocol, etc., as payload. The streams of TDM traffic 411 and 419 can be transmitted in a number of scenarios. The streams of TDM traffic 411 and 419 may be switched into the ring through the packet switching mechanism in one node and exit the ring as TDM traffic from another node. The streams of TDM traffic 411 and 419 may be switched into the ring as layer 2/3 traffic through the packet switching mechanism in one node and exit the ring through the packet switching mechanism in another node in the form of layer 2/3 traffic. These examples are described as illustrations to aid in understanding the invention and not meant to be limiting upon the invention.

FIG. 4B is a diagram illustrating an example traffic flow while there is a failure in an optical span according to one embodiment of the invention. In FIG. 4B, the East transmit span 403 fails (e.g. a severed line, failing hardware, etc.). The West transmit span 401 continues to carry the stream of TDM traffic 409 in the working TDM pipe 402. The West transmit span 401 also continues to carry the stream of TDM traffic 411 having layer 2/3 traffic as payload, but only in a working layer 2/3 subpipe 433. A protecting layer 2/3 subpipe 435 now carries the stream of TDM traffic 419 having layer 2/3 traffic as payload because all traffic traveling in the working channel 406 of the East transmit span 403 prior to the failure was protection switched to the protection channel 407 of the West transmit span 401. The East stream of TDM traffic 417 now travels in the protecting TDM pipe 410 of the West transmit span 401. The West protecting TDM pipe 410 is the same size or number of timeslots as the working TDM pipe 404.

As shown in the illustration of FIGS. 4A and 4B, the streams of TDM traffic 409 and 417 are transmitted at a constant rate because they utilize the same amount of bandwidth while there is not and is a failure. In contrast, the streams of TDM traffic 411 and 419 are transmitted at a variable rate. While a failure does not exist, both streams of TDM traffic 411 and 419 are transmitted over the layer 2/3 pipe which is allocated a large segment of bandwidth including some of the working channel and all of the protection channel timeslots. While a failure exists, the streams of variable rate TDM traffic 411 and 419 are transmitted over layer 2/3 subpipes which are allocated an equal amount of the timeslots not used by the constant rate TDM traffic 409 and 417.

The variability in the pipe size is possible because of the statistical multiplexing capability of the packet switching mechanism in the network elements of the ring. Specifically, the reduction in the amount of available bandwidth for the TDM traffic having layer 2/3 traffic as payload requires the packet switch of the network element to buffer and/or to drop layer 2/3 traffic to make sure that traffic fits the provided pipe.

FIG. 4C is a diagram of the example traffic flow 419 of FIGS. 4A and 4B while there is not and is a failure of the span 403 of FIGS. 4A an 4B in a ring according to one embodiment of the invention. In FIG. 4C, three nodes 431, 439, and 441 connect to each other to form an optical ring. Each node in a ring has a West and East transmit span, but in FIG. 4C only the East and West transmit spans from the node 431 and an East transmit span from the node 439 are shown. The West transmit span 401 carries traffic from node 431 to node 439. The East transmit span 403 carries traffic from the node 431 to the node 441. The East transmit span 440 carries traffic from the node 439 to the node 441. As previously shown in FIG. 4A, the variable rate TDM traffic 419 travels over the layer 2/3 subpipe 414 to node 441. Once node 431's East transmit span 403 fails, the variable rate TDM traffic 419 travels over the protecting layer 2/3 subpipe 435. Since the variable rate TDM traffic 419 is destined for node 441, the variable rate TDM traffic 419 is switched through node 439 and travels along node 439's East transmit span 440 in its protecting layer 2/3 subpipe 443. Node 439 knows to transmit the variable rate TDM traffic 419 onto a protecting layer 2/3 subpipe because node 431 has communicated to node 439 a protection switch.

As an illustration of the protection switch in relation to end users, assume that traffic from a first, second, and third user enter the ring illustrated in FIG. 4C at node 431. Also assume that the first and second user's traffic is to be terminated at node 441 and exit the ring at node 441 to an external network element. The third user is to be terminated at node 439 and exit the ring to an external network element.

The traffic from all three users is transmitted over the layer 2/3 pipe from node 431 to node 441. The traffic from the third user is switched through the packet mesh of node 441 and transmitted over a second layer 2/3 pipe (not shown) between node 441 and node 439. As before, assume that there is a failure of span 403. While there is this failure, the traffic in the layer 2/3 pipe 414 is switched to the protecting layer 2/3 pipe 435. The traffic from all three users is passed through the cross connect of node 439 and terminated at node 441. The traffic from the first and second users exit the ring at node 441 while the traffic from the third user is switched through the packet mesh of node 441 and transmitted back to node 439 over the working subpipe of the second layer 2/3 pipe (not shown).

As illustrated in FIG. 4C, a failure on the ring does not cause the loss of the traffic on the layer 2/3 pipe, just a reduction in the available bandwidth. This is because the layer 2/3 pipe is made partially from the working channel and partially from the protection channel. As such, this layer 2/3 pipe is more sellable to customers than the extra traffic described in the background section because a failure does not result in a total loss of service. Moreover, using the BLSR protection scheme enables the traffic traveling in the layer 2/3 pipe to be protection switched in a 50 millisecond time frame.

To provide an example of the manner in which the layer 2/3 pipe could be sold, assume that the working and protection channel parts of the layer 2/3 pipe 414 are respectively 30 mbps and 90 mbps. Assume, that each of the first, second and third users above want an equal amount of bandwidth of the layer 2/3 pipe 414. Each customer could be offered a guaranteed (in the event of a single failure) 10 mbps and a maximum of 40 mbps. The customers traffic at node 431 would be statistically multiplexed to fit the size of the layer 2/3 pipe currently being provided. The guaranteed 10 mbps per customer would be provided by the working subpipe on span 403 or the protecting layer 2/3 subpipe 435. The maximum 30 mbps per customer would be provided by the protection subpipe on span 403 while there is no failure. In this manner, partially BLSR protected layer 2/3 traffic is provided around the ring.

It should be understood that the ability to offer a guaranteed minimum bandwidth requires that the bandwidth of the layer 2/3 pipes on the ring not be oversold. Thus, in the above example, to offer the third user the service identified above, the ring provider would also have at least the needed bandwidth (guaranteed 10 mbps and a maximum of 40 mbps) on the second layer 2/3 pipe from node 441 to node 439 (not shown) because the third users traffic must traverse that span as well as span 403. In other words, if a potential user's traffic must traverse multiple spans of the ring in layer 2/3 pipes, each of these layer 2/3 pipes must have available the necessary bandwidth.

It should also be noted that not every network element in the ring need to be of the type that is capable of both TDM and packet switching (a hybrid network element). Specifically, while node 431 must be a hybrid network element, the node 439 could be a standard TDM network element capable of only performing TDM switching. Thus, compatibility is maintained.

Figure 5:
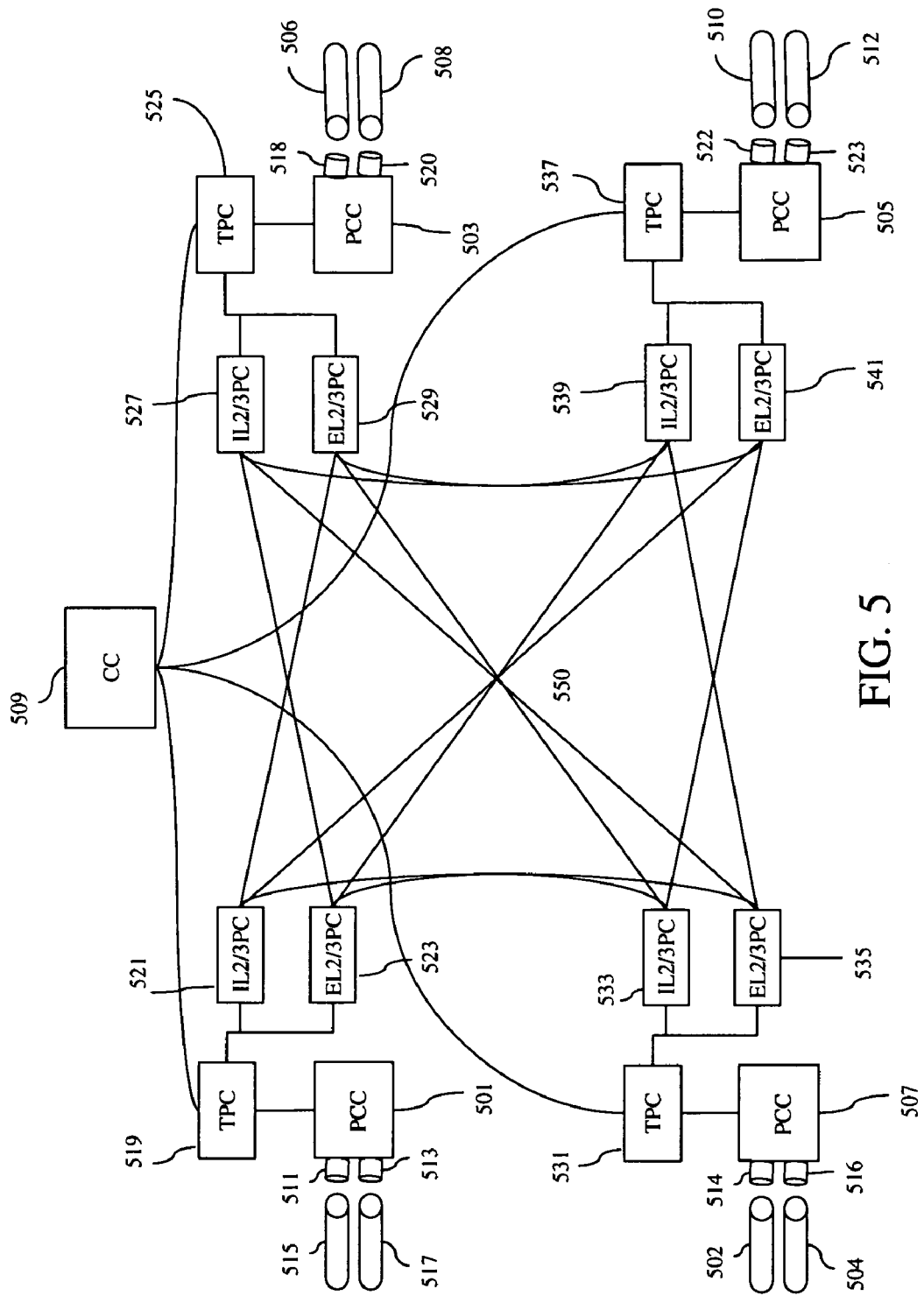
FIG. 5 is a diagram of circuit components in a hybrid network element according to one embodiment of the invention.

FIG. 5 is a diagram of circuit components in a hybrid network element according to one embodiment of the invention. While in this embodiment separate switching mechanisms are provided for the TDM and packet switching (namely a TDM switch fabric and a packet mesh), alternative embodiments could provide a single switching mechanism and/or different switching mechanisms (e.g., a packet switch fabric, a TDM mesh, etc.). In FIG. 5, four optical transmit fibers 515, 502, 506, 510 connect to physical ports 511, 514, 518, and 522 respectively. Four optical receive fibers 517, 504, 508, and 512 connect to physical ports 513, 516, 520, and 523 respectively. TDM traffic is received over the optical receive fibers 517, 504, 508, 512 and transmitted over the optical transmit fibers 511, 514, 518, 522. The TDM traffic is transmitted and received as optical signals by physical connection circuitry (PCC) 501, 507, 503, 505. The PCCs convert optical signals to electrical signals and vice versa for reception and transmission. The TDM traffic is transmitted and received between the PCCs 501, 507, 503, 505 and the TDM processing circuits (TPCs) 519, 531, 525, and 537 respectively as electrical signals. The TPCs transmit and receive TDM traffic from a control card (CC) 509. In another embodiment of the invention, each TPC and PCC is located on a single processing element, such as an application specific integrated circuit (ASIC). A hybrid network element is described in more detail in a patent application titled "Method and Apparatus for Switching Data of Different Protocols" to David Stiles and Gerald Neufeld, filed on Mar. 30, 2001, Ser. No. 09/823,480, which is hereby incorporated by reference.

The layer 2/3 traffic can be switched through the CC 509 or a packet mesh 550. The TPCs are programmable to insert and extract particular STSs that carry layer 2/3 traffic to be packet switched. If TDM traffic contains layer 2/3 payload to be switched through the packet mesh 550, then the TPCs 519, 531, 525, and 537 extract the layer 2/3 payload traffic from the TDM traffic and transmit the layer 2/3 traffic to ingress layer 2/3 processing circuitry 521, 533, 527, and 539 respectively. The TPCs 519, 531, 525, and 537 also receive layer 2/3 traffic from egress layer 2/3 processing circuitry 521, 533, 527, and 539 respectively. For a variable rate layer 2/3 traffic pipe, the egress layer 2/3 processing circuitry includes the ability to queue and statistically multiplex layer 2/3 traffic before transmitting it to a TPC. The TPCs 519, 531, 525, and 537 process the layer 2/3 traffic placing it into SONET/SDH frames for transmission in timeslots. The TPCs 519, 531, 525, and 537 are programmable to insert and extract particular STSs that carry the layer 2/3 traffic to be packet switched.

The CC 509 detects failures, maintains a BLSR state machine, and updates the TDM cross connect table in response to changes in the BLSR state machine. The CC 509 also sends a message to update the logical interfaces for packet BLSR protection switching. Typically an interface is a physical interface or port. A logical interface is the logical connection from a first network element to another network element or node which may or may not be adjacent to the first network element. The logical interface refers to a physical port or interface which can be changed. In addition, the CC 509 sends messages to reprogram the TPCs to handle a protection switch (e.g., reorient concatenations, redirect channels to packet mesh and CC, etc.).

To provide an example of the reprogramming of the network elements to handle a ring switch, assume that the ring of FIG. 4C is a 2 fiber OC-12 BLSR (that is, 6 STSs for working and 6 STSs for protection in each direction). Also assume that each of the nodes of FIG. 4C is implemented as the network element illustrated in FIG. 5; that the PCC 501 of a given node is connected through fiber to the PCC 503 of the adjacent node; that the fibers 515 and 506 are the transmit fibers; that the PCC 503 of node 431 is connected through fiber to PCC 501 of node 441; and that the fibers 517 and 508 are the receive fibers. Table 1 below illustrates the concatenations and the redirection of STSs programmed in the TPCs 519 and 525 of each node while there is not and is a failure on span 403.

all three users is transmitted from the IL2/3PC 533 across the packet mesh 550 to the EL2/3PC 529 according to the forwarding tables, which refer to logical interfaces, and

| Node | While There is Not a Failure | | While There is a Failure | |
|---|---|---|---|---|
| | TDM | Layer 2/3 Pipe | TDM | Layer 2/3 Pipe |
| 431 | On TPC 519 for transmit fiber 515: X on channels 1–4, where X is some particular arrangement On TPC 525 for transmit fiber 506: STS 1 on channel 1; STS 3C on channels 2–4 | On TPC 519 for transmit fiber 515: STS 2C on channels 5–6; STS 6C on channels 7–12 On TPC 525 for transmit fiber 506: STS 2C on channels 5–6; STS 6C on channels 7–12 | On TPC 519 for transmit fiber 515: X on channels 1–4; STS 1 on channel 7 protecting TDM; STS 3C on channels 8–10 protecting TDM On TPC 525 for transmit fiber 506: Nothing | On TPC 519 for transmit fiber 515: STS 2C on channels 5–6; STS 2C on channels 11–12 protecting layer 2/3 subpipe On TPC 525 for transmit fiber 506: Nothing |
| 441 | On TPC 519 for receive fiber 517: STS 1 on channel 1; STS 3C on channels 2–4 On TPC 525 for receive fiber 508: Y on channels 1–4, where Y is some particular arrangement | On TPC 519 for receive fiber 517: STS 2C on channels 5–6; STS 6C on channels 7–12 On TPC 525 for receive fiber 508: STS 2C on channels 5–6; STS 6C on channels 7–12 | On TPC 519 for receive fiber 517: Nothing On TPC 525 for receive fiber 508: Y on channels 1–4; STS 1 on channel 7 protecting TDM; STS 3C on channels 8–10 protecting TDM | On TPC 519 for receive fiber 517: Nothing On TPC 525 for receive fiber 508: STS 2C on channels 5–6; STS 2C on channels 11–12 protecting layer 2/3 subpipe |
| 439 | On TPC 519 for transmit fiber 515: Y on channels 1–4 On TPC 525 for receive fiber 508: X on channels 1–4 | On TPC 519 for transmit fiber 515: STS 2C on channels 5–6; STS 6C on channels 7–12 On TPC 525 for receive fiber 508: STS 2C on channels 5–6; STS 6C on channels 7–12 | On TPC 519 for transmit fiber 515: Y on channels 1–4; STS 1 on channel 7 protecting TDM; STS 3C on channels 8–10 protecting TDM On TPC 525 for receive fiber 508: X on channels 1–4; STS 1 on channel 7 protecting TDM; STS 3C on channels 8–10 protecting TDM | On TPC 519 for transmit fiber 515: STS 2C on channels 5–6; STS 2C on channels 11–12 protecting layer 2/3 subpipe On TPC 525 for receive fiber 508: STS 2C on channels 5–6; STS 2C on channels 11–12 protecting layer 2/3 subpipe b |

In addition to the reprogramming of the TPCs, the cross connect tables and the logical interfaces are altered accordingly. As in the example described above, traffic for three users enter the ring at node 431 of FIG. 4C. To extend this example, assume that the traffic from these three users is switched into the ring in node 431 from the PCC 507 through the packet mesh 550, that the traffic from the first and second user is exiting the ring at node 441 through PCC 505 after being switched through the packet mesh 550, and that the traffic from the third user is exiting the ring at node 439 through PCC 505 after being switched through the packet mesh 550. While there is not a failure, the traffic from transmitted in the layer 2/3 pipe by TPC 525. While there is a failure of the fibers connecting into 431's PCC 503, the logical interfaces are modified so that the traffic from the three users is switched through the packet mesh from IL2/3PC 533 to the EL2/3PC 523 and transmitted in the protecting layer 2/3 pipe to node 439 by the TPC 519 which has been reprogrammed as described above.

In node 439, while there is not a failure, the traffic from the third user is received at the IL2/3PC 521 and switched through the packet mesh 550 to EL2/3PC 541. While there is a failure, the node 439 is modified so that the traffic for the three users received from node 431 on node 439's PCC 503 in the protecting layer 2/3 channel is switched to the protecting layer 2/3 channel to node 441. This switch will go through the cross connect, and is in fact a BLSR pass-through. An additional change for the dropping of the third users traffic is in the next paragraph.

In node 441, while there is not a failure, the traffic from all three users is received at the IL2/3PC 521 and switched through the packet mesh 550: the first and second users' traffic is switched to EL2/3PC 541, while the third user's traffic is switched to EL2/3PC 529. While there is a failure between two adjacent nodes, the logical interfaces are modified because of the failure so that the traffic for the first and second users received from node 439 on node 441's PCC 503 is switched through the packet mesh 550 from the IL2/3PC 527 to the EL2/3PC 541 and transmitted out of the ring through the PCC 505. The traffic for the third user is switched through the packet mesh from the IL2/3PC 527 to the EL2/3PC 529 and transmitted out the PCC 503 on the working layer 2/3 channel to node 439 by the TPC 525. The traffic from the third user is received at node 439 at the PCC 501 on the working layer 2/3 channel and switched through the packet mesh 550 from the IL2/3PC 521 to the EL2/3PC 541 in accordance with the forwarding tables and transmitted out of the ring by the PCC 505.

To provide another example of the reprogramming of the TPCs to handle a protection switch, assume that the ring of FIG. 4C is a 4 fiber OC-48 BLSR. In a 4 fiber implementation of the invention, a load balancing mechanism would be implemented to balance traffic between the working layer 2/3 channel and the protecting layer 2/3 channel (e.g., multi-link PPP, ATM SAR, etc.). Also assume that each of the nodes of FIG. 4C is implemented as the network element illustrated in FIG. 5; that the PCCs 501 and 507 are the transmit and receive pair respectively for the East span; and that the PCCs 503 and 505 are the transmit and receive pair respectively for the West span. Thus, while there is a failure requiring a ring switch on the East span of a node: 1) traffic coming in PCC 505 is protection switched to PCC 503; and 2) the redirect/concatenations of the TPCs 519 and 531 must be altered. Whereas while there is a failure requiring a ring switch on the West span of a node: 1) traffic coming in PCC 507 is protection switched to PCC 501; and 2) the redirect/concatenations of the TPCs 525 and 537 must be altered. In addition, while there is a failure requiring a ring switch on a midspan node, the redirect/concatenations of the TPCs 531 and 537 must be altered accordingly. The redirect/concatenations of the TCPs 519 and 525 are not affected because of the assumption that TPCs 519 and 525 correspond to working channels.

To provide a more specific example, assume that while there is not a failure, node 431 transmits TDM traffic as STS-12c and STS-24c through the PCC 503 to node 441. The channels used for the STS-12c and STS-24c traffic are collectively referred to as the working TDM pipe. Node 431 transmits over the layer 2/3 pipe STS-12c and STS-48c of traffic through PCC 503 and PCC 505 respectively to node 441 of FIG. 4C. The same configuration of traffic is transmitted to node 439 from node 431 through PCCs 501 and 507. If the span corresponding to PCC 503 is lost (e.g., the card having PCC 503 is removed, the fibers 506 and 508 are severed, etc.), the control card 509 detects the failure, updates the BLSR state machine, and reprograms the TPC 537. The TPC 537 is reprogrammed to match the concatenations, channel redirects, etc., of TPC 525. A span switch occurs so that the traffic previously transmitted over the span corresponding to PCC 503 now is transmitted over the span corresponding to PCC 505. Hence the working TDM pipe and working layer 2/3 pipe survive through PCC 505.

If both spans between nodes 431 and 441 (the span corresponding to PCC 503 and the span corresponding to PCC 505) are lost (e.g. cables 506, 508, 510 and 512 are severed, both cards having PCCs 503 and 505 are pulled, etc.), then a ring switch will occur. The control card 509 will detect a failure of the spans between nodes 431 and 441. The control card 509 will update the BLSR state machine, reprogram TPC 531, and send a message to node 439 indicating the failure. The control card 509 reprograms the TPC 531 to match the concatenations, channel redirects, etc., of TPC 525. Hence, traffic originally transmitted from node 431 to node 441 through PCCs 503 are now transmitted through PCC 507.

On the nodes adjacent to the failure, the logical interfaces will be reprogrammed, but the destinations in the forwarding tables will not be changed (This is an effect of having two switch mechanisms providing alternative paths; as such, this may not be required in other implementations). An alternative embodiment could be implemented with a single path through the cross-connect. In such an alternative embodiment, the packet mesh would be subordinate to the cross-connect since all traffic including packet switched traffic would pass through the cross-connect when entering or exiting the box.

Figure 6:
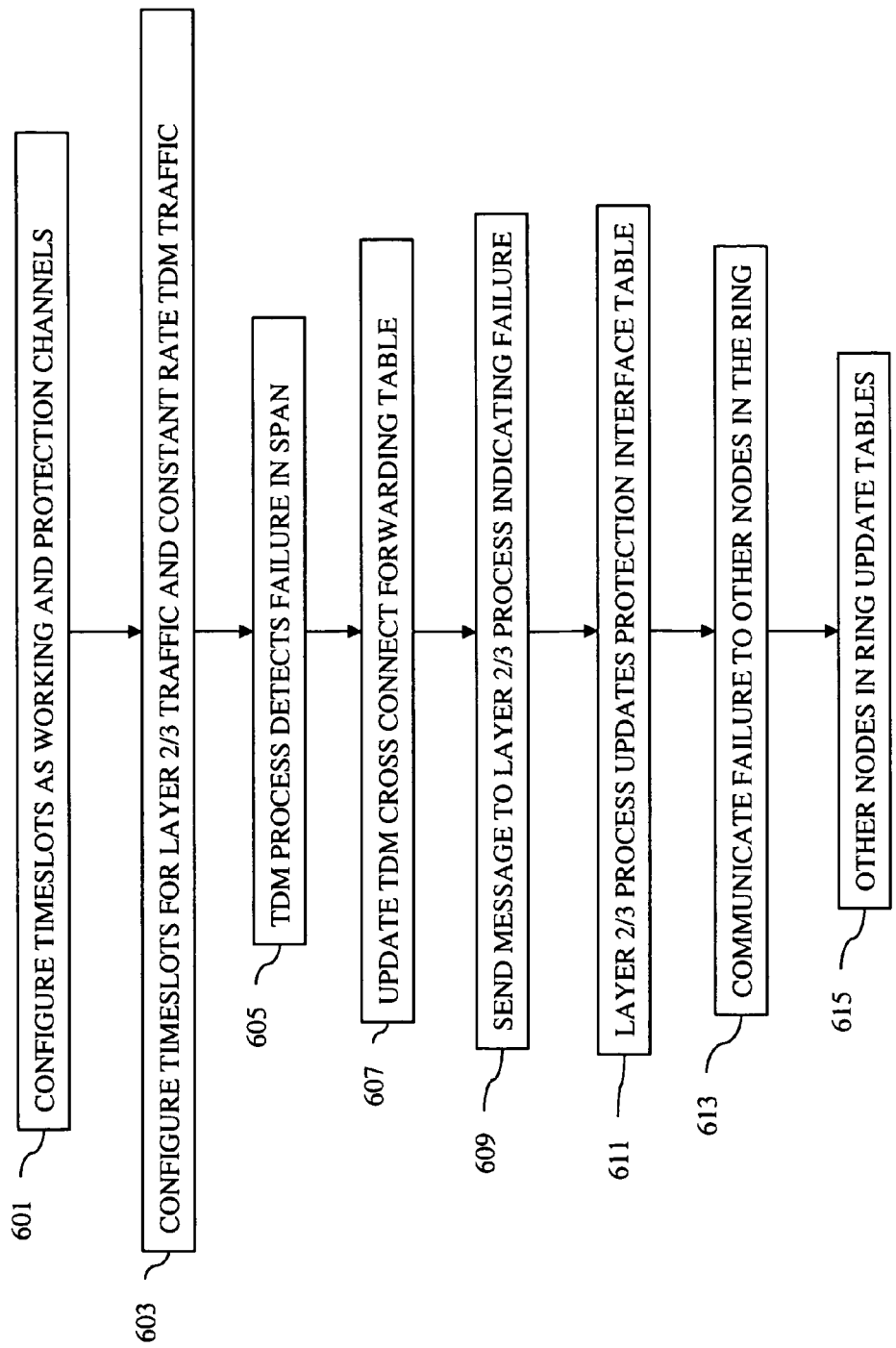
FIG. 6 is a flowchart for allocating a layer 2/3 pipe and subpipes in an optical ring according to one embodiment of the invention.

FIG. 6 is a flowchart for allocating a layer 2/3 pipe and subpipes in an optical ring according to one embodiment of the invention. At block 601, a network administrator configures timeslots as working and protection channels on each node of a ring. At block 603, the network administrator determines which timeslots will be processed as layer 2/3 traffic and which timeslots will be processed as TDM traffic. At block 605, a TDM process running on a control card of a node in the ring detects a failure in one of the node's spans. The TDM process updates a TDM cross connect forwarding table managed on the control card at block 607. At block 609, the TDM process sends a message to a layer 2/3 process indicating the failure. The layer 2/3 process updates a protection interface table in response to the message from the TDM process at block 611. At block 613, the node communicates the failure to other nodes in the ring. At block 615, the other nodes in the ring update their cross connect tables and logical interfaces in accordance with the failure detected by the detecting node.

In another embodiment of the invention, the protection interface table is a data structure with a reference to a logical working interface and a logical protection interface. The logical working interface corresponds to a physical port connecting to a transmit fiber to carry traffic destined for a node X going in a preferred direction on the ring. The logical protection interface corresponds to another physical port connected to a transmit fiber destined for the node X, but going in the opposite direction and possibly through other nodes in the ring. A logical interface stored in a layer 2/3 forwarding table initially refers to the logical working interface while there is not a failure. While there is a failure, the logical interface refers to the logical protection interface. While the failure is corrected, the logical interface is updated to refer to the logical working interface. In another embodiment of the invention, a routine manages logical interfaces and another routine manages alternate interfaces. A network administrator configures alternate interfaces on a network element. The alternate interface manager will create a data structure to refer to 2 logical interfaces which are managed by the interface manager. One of the interfaces will be the working interface while the other interface will be the protecting interface. In the layer 2/3 forwarding table, a circuit identifier is associated to either a logical interface or a alternate interface. Upon a failure notification, the alternate interface manager will alter the data structure to reference the logical interface acting as the protecting interface. In another embodiment of the invention, the TDM process instead of the layer 2/3 process updates a data structure indicating protection interfaces.

The owner of the optical ring can now offer protected service to multiple customers. Typically, only the traffic traveling in the working channel was sold to customers since consumers did not want to purchase a service which may be interrupted (e.g., for days). Alternatively, a consumer may choose to purchase at a reduced cost, the extra traffic service from 2 providers. This consumer would alternate between these providers as failures occurred. With a layer 2/3 pipe, the owner of the optical ring can offer multiple classes of service. In addition to the traditional constant rate TDM traffic service, the network owner or provider can offer a variable rate TDM traffic service to customers because the payloads are layer 2/3 units of traffic. For example, if bandwidth corresponding to a layer 2/3 pipe transmits at a rate of 100 megabits per second with 20 megabits corresponding to the layer 2/3 subpipes, the owner or provider can offer a service guaranteeing a rate of 20 megabits per second with a maximum of 100 megabits per second. This variable rate service can be offered to multiple people since the TDM payloads are layer 2/3 units of traffic. In addition, the variable rate service can be offered with a BLSR protection time of 50 milliseconds. Furthermore, the owner or provider of the optical network, is not forced to either donate or sell at a reduced cost 50% of their bandwidth. The owner of provider can sell 100% of its bandwidth with the combination of standard TDM service and the variable rate TDM service.

A continuum of embodiments exist for the invention. On one end of the continuum is an embodiment only utilizing BLSR protection. On the other end of the continuum is an embodiment only utilizing layer 2/3 protection. An embodiment utilizing BLSR protection has already been described. Another embodiment of the invention representing the layer 2/3 end of this continuum switches layer 2/3 traffic through the packet mesh of every hybrid network element of a BLSR. An embodiment of the invention in a 2-fiber BLSR representing this other end of the continuum is described herein.

Figure 7A:
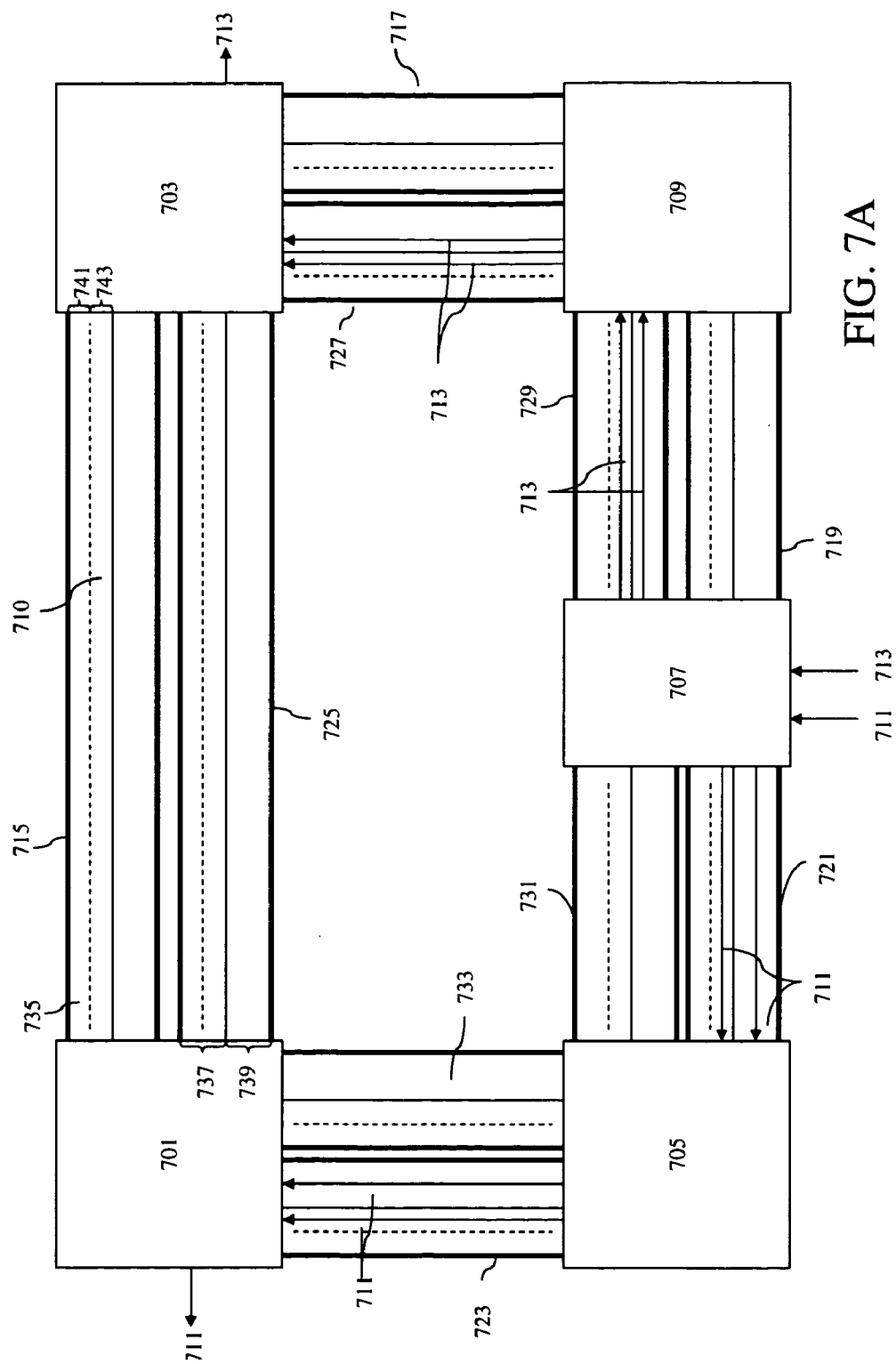
FIG. 7A illustrates traffic flowing through the BLSR while there is not a failure according to one embodiment of the invention.
Figure 7B:
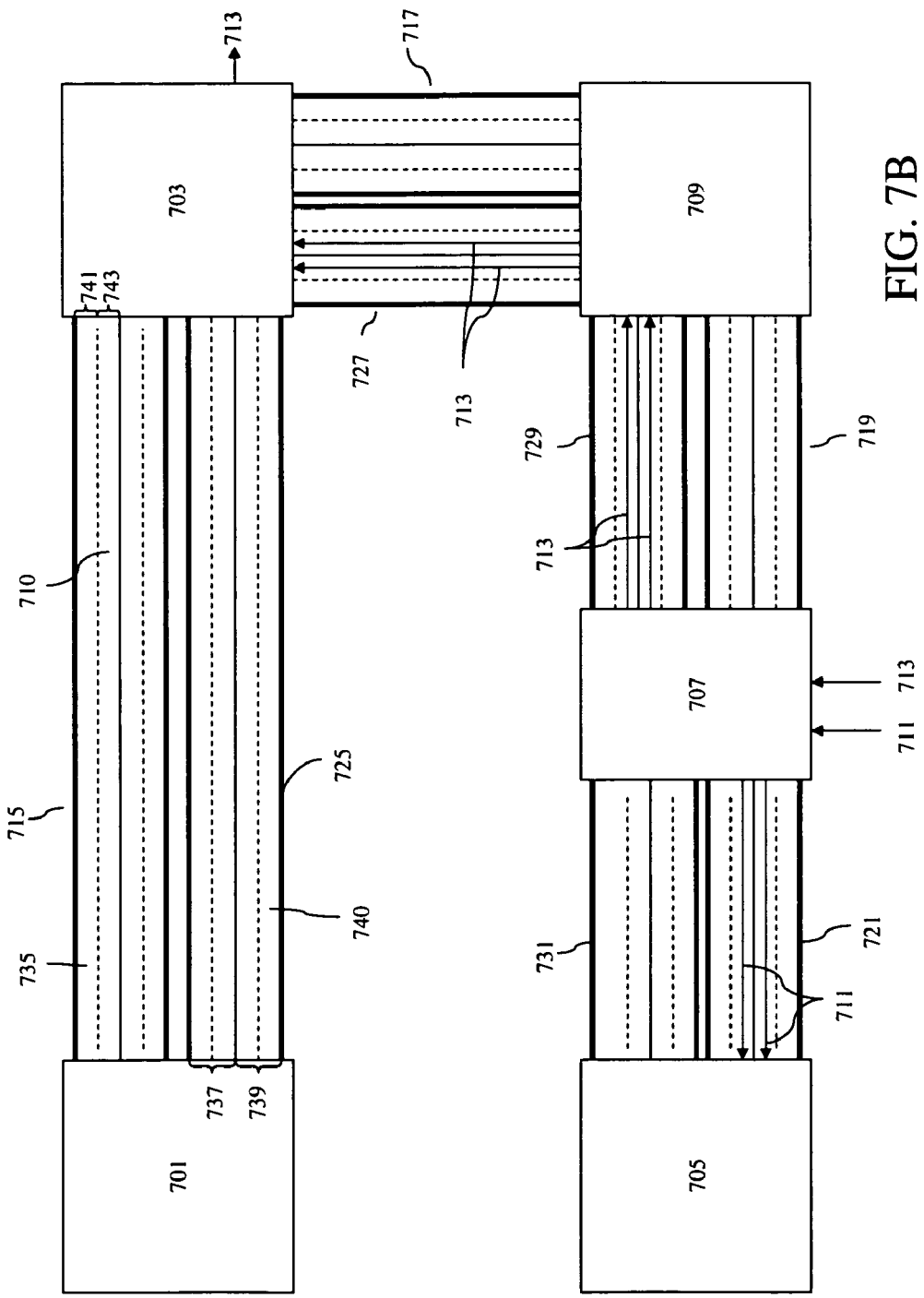
FIG. 7B illustrates the example traffic flow through the BLSR while there is a failure before a routing protocol detects the failure according to one embodiment of the invention.
Figure 7C:
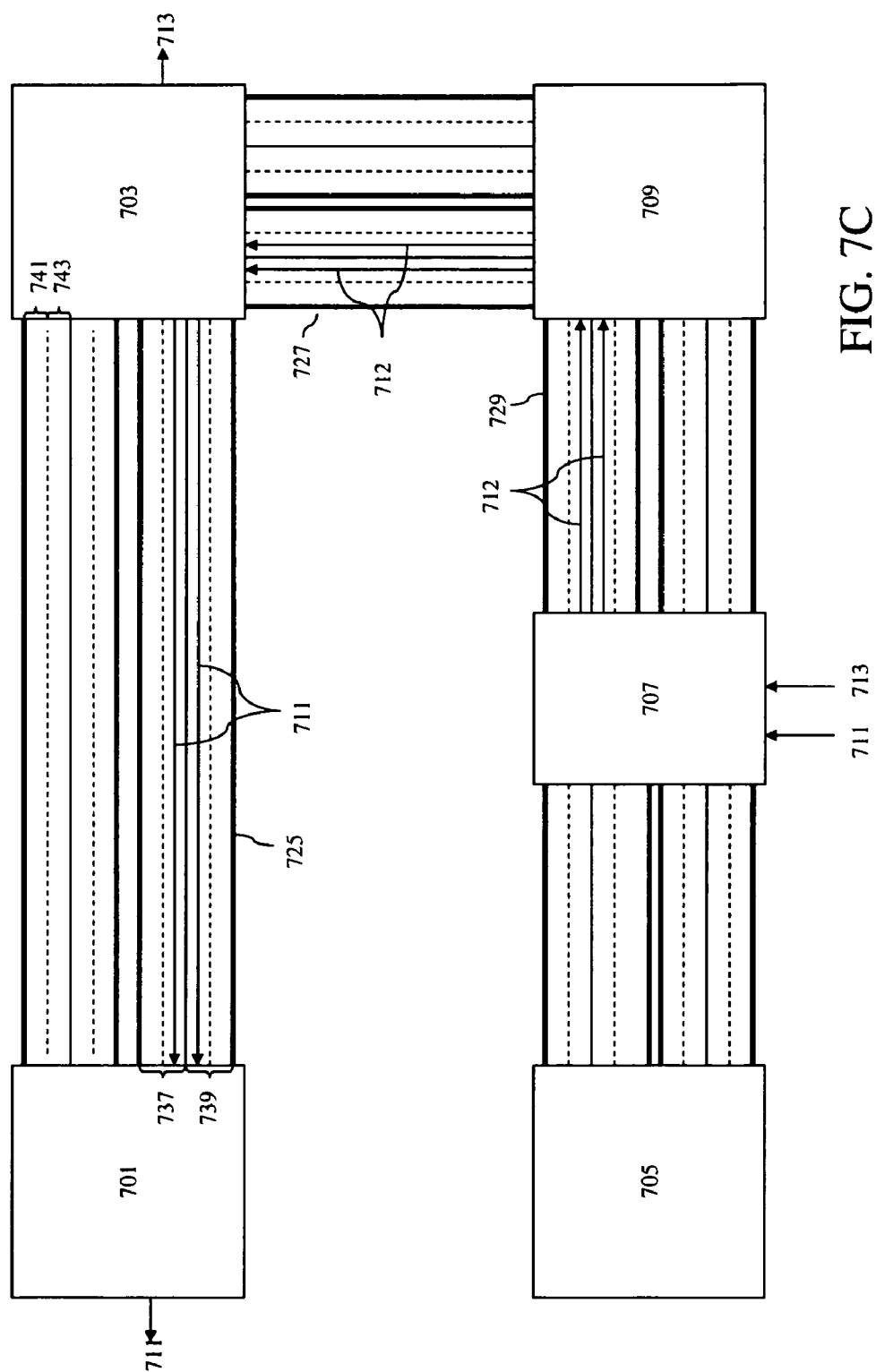
FIG. 7C illustrates the example traffic flow through the BLSR while there is a failure after the routing protocol detects the failure according to one embodiment of the invention.

FIGS. 7A–7C illustrate an example of traffic flowing through a BLSR while there is and while there is not a failure according to one embodiment of the invention. FIG. 7A illustrates traffic flowing through the BLSR while there is not a failure according to one embodiment of the invention. In FIG. 7A, the BLSR includes five nodes 701, 703, 705, 707, and 709. The BLSR can be divided into two logical rings: an outer ring and an inner ring. Links 725, 733, 731, 729, and 727 form the inner ring and carry traffic in a counter-clockwise direction. Links 715, 717, 719, 721, and 723 form the outer ring and carry traffic in a clockwise direction. Each link is divided into a working channel 737 and a protecting channel 739 by a line 710. Each working channel 737 is conceptually divided into a working optical pipe 741 and a working layer 2/3 pipe 743 separated by a dashed line 735. A set of layer 2/3 traffic 711 enters the BLSR through the packet mesh of node 707. The set of traffic is destined for node 701. In this example, the set of traffic is placed on the outer ring path and transmitted over the protecting channel 739 and the working layer 2/3 pipe 743 of the links 721 and 723 to node 701. At node 701, the set of traffic 711 exits the ring through the packet mesh of node 701. A set of layer 2/3 traffic 713 also enters the ring through the packet mesh of node 707. The set of traffic 713 is destined for node 703. In this example, the set of traffic 713 is placed on the inner ring path and transmitted over the protecting channel 739 and working layer 2/3 pipe 743 of the links 729 and 727. The set of traffic 713 exits the ring through the packet mesh of node 703. Additional traffic can enter and exit the ring though any of the five nodes 701, 703, 705, 707 or 709, but only the sets of traffic 711 and 713 are focused for ease of understanding.

FIG. 7B illustrates the example traffic flow through the BLSR while there is a failure before a routing protocol detects the failure according to one embodiment of the invention. In FIG. 7B, the span between nodes 701 and 705 fails. The BLSR performs automatic protection switching in response to the failure. A line 740 indicates the division of the protecting channel 739 into a protecting layer 2/3 pipe 744 and a protecting optical pipe 742 on every link. Optically switched traffic traveling over the outer ring that would travel between nodes 701 and 705 is switched to the protecting optical pipe 742 of the inner ring. Likewise, optically switched traffic traveling over the inner ring that would travel between nodes 701 and 705 is switched to the protecting optical pipe 742 of the outer ring. Since the layer 2/3 traffic traveling on the ring is switched through the packet mesh of each node, it is not automatically switched to a new path. At this point in time while there is a failure, the routing protocol has not detected the failure between nodes 701 and 705. Therefore, the set of traffic 711 continues to be transmitted to node 705, but in a smaller bandwidth because of the protection switched traffic which now occupies the protecting optical pipe 742 of the link 721. Until the routing protocol updates forwarding tables in response to the ring failure, some of the set of traffic 711 is dropped at node 705. The set of traffic 713 is transmitted in a reduced pipe because of the BLSR automatic protection switch.

FIG. 7C illustrates the example traffic flow through the BLSR while there is a failure after the routing protocol detects the failure according to one embodiment of the invention. In FIG. 7C, the routing protocol has recalculated a path for the set of traffic 711. Although any number of paths may result, this example describes the fastest alternative path as being through nodes 709 and 703. The set of traffic 711 is no longer transmitted from node 707 to node 705. As a result of routing calculations, the set of traffic 711 is transmitted on the inner ring. The sets of traffic 711 and 713 are statistically multiplexed together to be transmitted over the working layer 2/3 pipe and the protecting layer 2/3 pipe on links 727 and 729 (i.e. the sets of traffic 711 and 713 share the bandwidth provided by the working layer 2/3 pipe and the protecting layer 2/3 pipe). The multiplexed set of traffic is denoted as traffic 712. At node 703, the set of traffic 713 is switched out of the ring through the packet mesh of node 703. The set of traffic 711 continues around the ring to node 701 over the link 725. At node 701, the set of traffic 711 is switched out of the ring through the packet mesh of node 701.

An embodiment of the invention utilizing layer 2/3 protection is able to deliver best-effort service and differentiated service level Quality of Service (QoS). An embodiment of the invention only utilizing BLSR protection for all traffic on a BLSR is able to deliver guaranteed service level QoS. Embodiments of the invention falling between these two extremes are able to deliver a mixture of service level QoS. Best-effort service is basic connectivity without guarantees. Differentiated service does not offer a guarantee, but traffic is treated based on statistical preference. Various embodiments of the invention can be applied to a network depending on the traffic characteristics of the network.

For example, if layer 2/3 traffic traveling over the ring is erratic or occurs in bursts, an embodiment of the invention which provides for guaranteed bandwidth allows bandwidth to remain idle. For example, assume users A and B are guaranteed 10 Mbits/sec of bandwidth. Even though one user may only be using 2 Mbits/sec of bandwidth, the other user cannot go beyond 10 Mbits/sec of bandwidth. Embodiments of the invention similar to that illustrated in FIGS. 7A–7C, statistically multiplex all traffic from users over the available bandwidth. Using the example above, users A and B are provided 20 Mbits/sec of bandwidth. If one user only uses 2 Mbits/sec, then 18 Mbits/sec of bandwidth is available to the other user. In addition, switching traffic through the packet mesh makes available the variety of services available with layer 2/3 traffic (e.g., prioritization, traffic shaping, QoS signaling, etc.).

Furthermore, an embodiment of the invention utilizing layer 2/3 protection allows varying pipe sizes around the ring. A network administrator can adjust the amount of working channel bandwidth allocated to the working optical pipe and the working layer 2/3 pipe in accordance with traffic characteristics on a span by span basis. The ability to customize part of the ring increases efficient utilization of the ring.

Figure 8A:
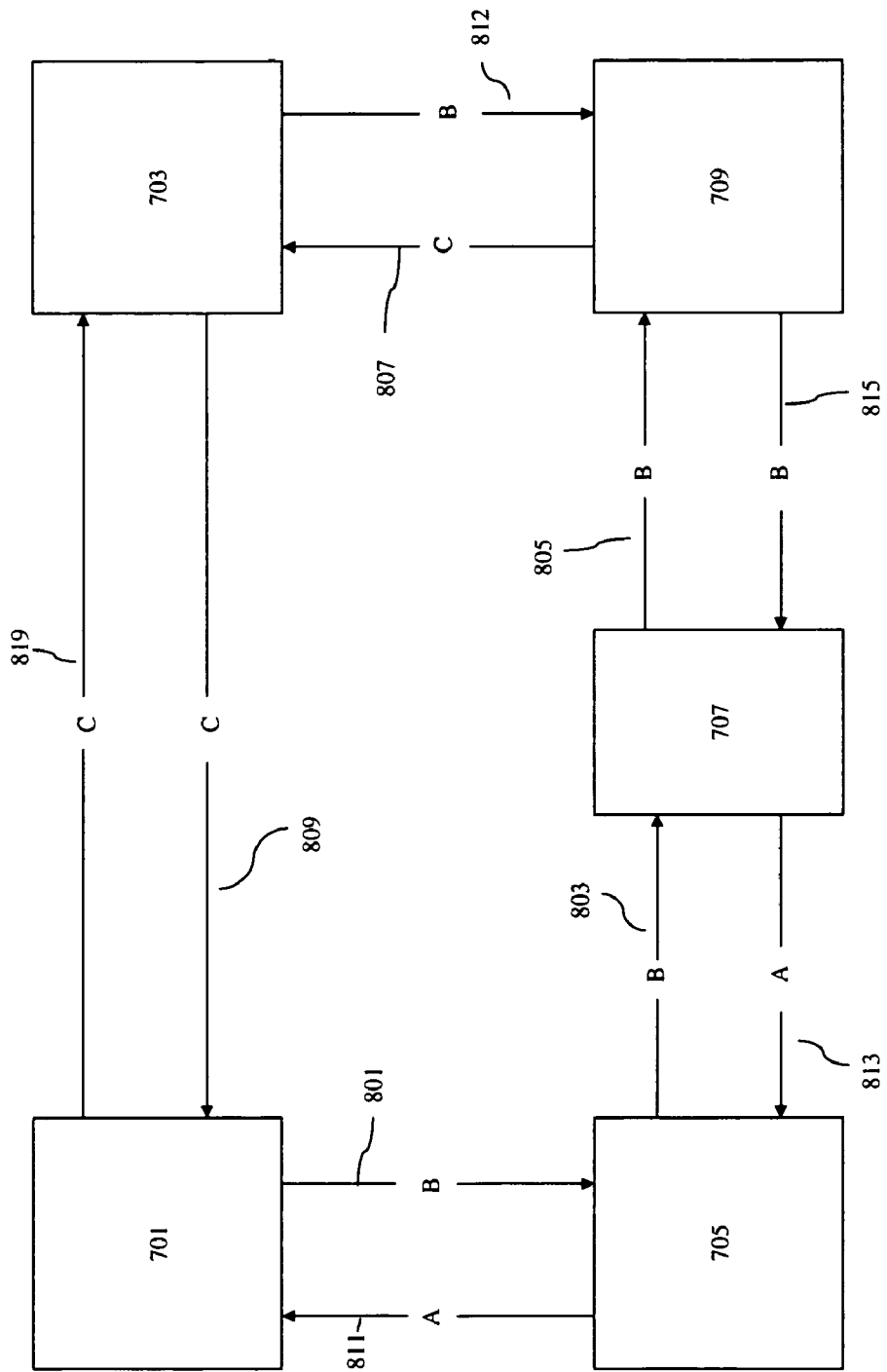
FIG. 8A illustrates varying concatenations over the BLSR of FIGS. 7A–7C while there is not a failure according to one embodiment of the invention.
Figure 8B:
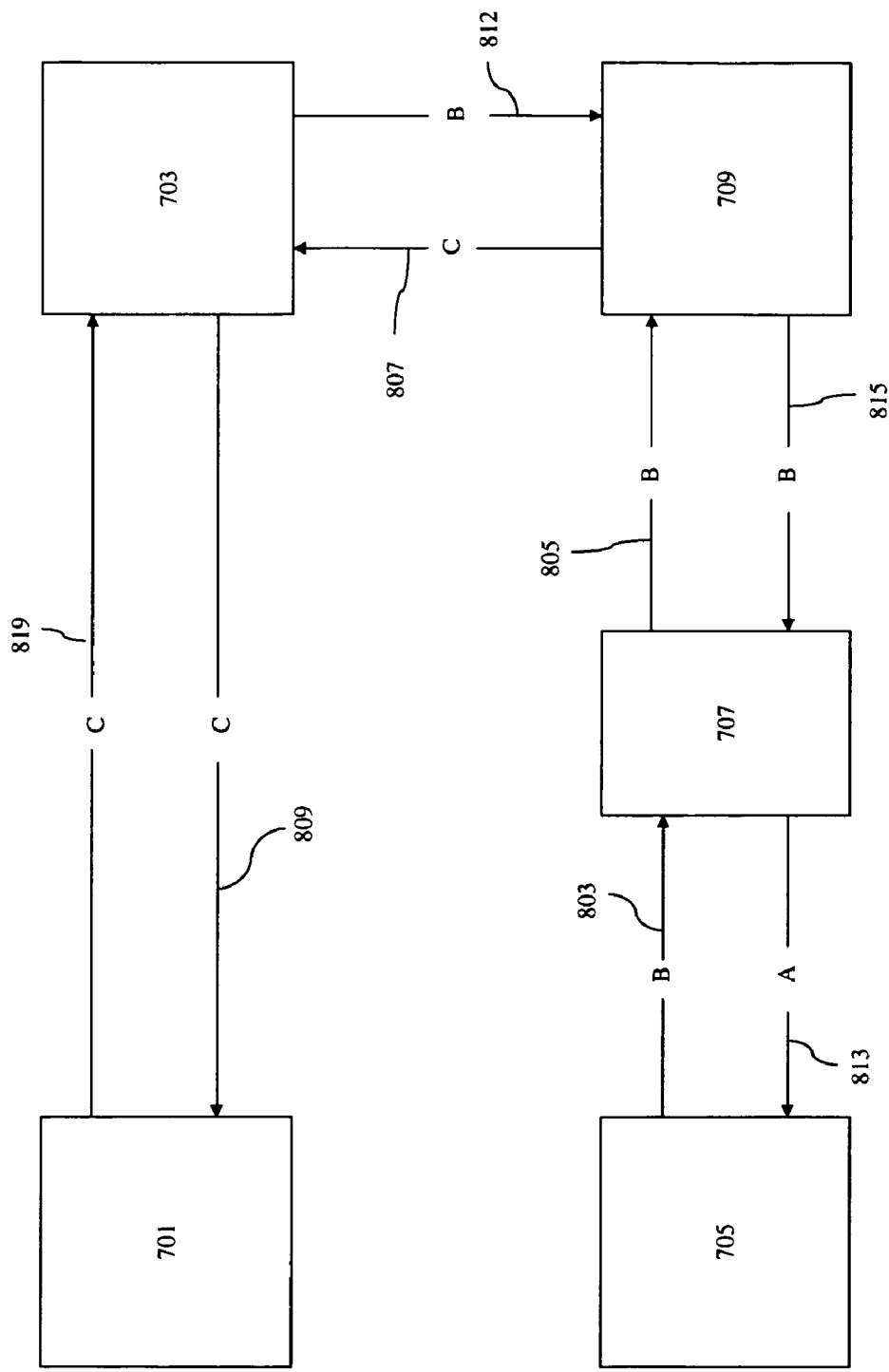
FIG. 8B illustrates a failure in the BLSR according to one embodiment of the invention.

FIGS. 8A–8B illustrate example provisioning of varying size pipes around a BLSR and changing concatenations according to one embodiment of the invention. To illustrate this example of varying pipe sizes and changing concatenations in the network elements to handle a ring switch, assume that the ring of FIGS. 8A–8B is a 2 fiber OC-12 BLSR (6 STSs for working and 6 STSs for protecting in each direction). Also assume that each of the nodes of FIGS. 8A–8B is implemented as the network element illustrated in FIG. 5. FIG. 8A illustrates varying concatenations over the BLSR of FIGS. 8A–8B while there is not a failure according to one embodiment of the invention. In FIG. 8A, the BLSR of FIGS. 8A–8B has varying pipe sizes on each link. Each link is labeled with one of the letters A–C to identify the type of concatenation. Table 1 identifies the concatenations corresponding to each letter (concatenations in this example conform to current standards). In this example, the entire protecting channel is used for layer 2/3 traffic while there is not a failure. Hence, only the concatenations of the working channel traffic need be identified because all traffic in the protecting channel is concatenated as STS-6c in this example. In alternative embodiments, part of the protecting channel can be used for other types of traffic. Optically switched traffic transmitted in the working channel is denoted as Wt. Layer 2/3 traffic transmitted in the working channel is denoted as Wp.

TABLE 1

Concatenation of Pipes

| | A | B | C |
|---|---|---|---|
| t | STS-1 | STS-3c | STS-3c, STS-1, STS-1 |
| p | STS-3c, STS-1, STS-1 | STS-3c | STS-1 |

The concatenations corresponding to the letter A provide for a larger amount of bandwidth to layer 2/3 traffic. The concatenations corresponding to the letter C allot a larger amount of bandwidth to optically switched traffic. The concatenations corresponding to the letter B evenly allocate bandwidth to layer 2/3 traffic and optically switched traffic.

Table 2 identifies the concatenations for each link for both the inner ring and the outer ring. Since only layer 2/3 traffic will travel in the protecting channels of the ring, the column with the header "Pt" remains empty.

TABLE 2

Concatenation of Traffic While There Is Not A Failure

| | Wt | Wp | Pt | Pp |
|---|---|---|---|---|
| Inner Ring | | | | |
| 701 → 705 | STS-3c | STS-3c | | STS-6c |
| 705 → 707 | STS-3c | STS-3c | | STS-6c |
| 707 → 709 | STS-3c | STS-3c | | STS-6c |
| 709 → 703 | STS-3c, STS-1, STS-1 | STS-1 | | STS-6c |
| 703 → 701 | STS-3c, STS-1, STS-1 | STS-1 | | STS-6c |
| Outer Ring | | | | |
| 701 → 703 | STS-3c, STS-1, STS-1 | STS-1 | | STS-6c |
| 703 → 709 | STS-3c | STS-3c | | STS-6c |
| 709 → 707 | STS-3c | STS-3c | | STS-6c |
| 707 → 705 | STS-1 | STS-3c, STS-1, STS-1 | | STS-6c |
| 705 → 701 | STS-1 | STS-3c, STS-1, STS-1 | | STS-6c |

FIG. 8B illustrates a failure in the BLSR according to one embodiment of the invention. In FIG. 8B, the links 801 and 811 connecting nodes 701 and 705 fail. The BLSR performs an automatic protection switch in response to the failure of the links. The switch does not affect the concatenations of the traffic transmitted in the working channels of the ring (excluding the failed links). The concatenations of the traffic transmitted in the protecting channels are adjusted for the automatic protection switch as indicated in Table 3.

TABLE 3

Concatenation of Traffic While There Is A Failure

| | Wt | Wp | Pt | Pp |
|---|---|---|---|---|
| Inner Ring | | | | |
| 705 → 707 | STS-3c | STS-3c | STS-1 | STS-3c, STS-1, STS-1 |
| 707 → 709 | STS-3c | STS-3c | STS-1 | STS-3c, STS-1, STS-1 |
| 709 → 703 | STS-3c, STS-1, STS-1 | STS-1 | STS-1 | STS-3c, STS-1, STS-1 |
| 703 → 701 | STS-3c, STS-1, STS-1 | STS-1 | STS-1 | STS-3c, STS-1, STS-1 |
| Outer Ring | | | | |
| 701 → 703 | STS-3c, STS-1, STS-1 | STS-1 | STS-3c | STS-3c |
| 703 → 709 | STS-3c | STS-3c | STS-3c | STS-3c |
| 709 → 707 | STS-3c | STS-3c | STS-3c | STS-3c |
| 707 → 705 | STS-1 | STS-3c, STS-1, STS-1 | STS-3c | STS-3c |

As illustrated in Table 3, the concatenations for the traffic transmitted over the protecting channel are modified. The protecting channels of the inner ring are adjusted based on the working traffic switched from the outer ring. The protecting channels of the outer ring are adjusted based on the working traffic switched from the inner ring. Since the Wt traffic which previously traveled over the outer ring link between nodes 701 and 705 was transmitted as STS-1, then STS-1 of the protecting channel of the inner ring is used for the protection switched traffic. Likewise, since the Wt traffic which previously traveled over the inner ring link between nodes 701 and 705 was transmitted as STS-3c, then STS-3c of the protecting channel of the outer ring is used for the protection switched traffic from the inner ring. Hence, each node's TPC transmitting traffic in the protecting channel through the inner ring is reprogrammed from transmitting STS-3c of layer 2/3 traffic to transmitting STS-1 of optically switched traffic, 2 STS-1s of layer 2/3 traffic, and an STS-3c of layer 2/3 traffic. Each node's TPC transmitting traffic in the protecting channel of the outer ring is reprogrammed from transmitting STS-6c of layer 2/3 traffic to transmitting an STS-3c of layer 2/3 traffic and an STS-3c of optically switched traffic.

As indicated above, such an embodiment of the invention can also be applied to a 4-fiber BLSR or n-fiber BLSR.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

While the invention has been described in terms of several embodiments, those skilled in the art will recognize that the invention is not limited to the embodiments described. Although the invention has been described with reference to the TDM form of optical switching, the invention can be applied to any form of optical switching including wave division multiplexing, dense wave division multiplexing, etc. In addition, the invention has been described with respect to a 2 fiber and 4 fiber BLSR, but can be scaled to other n-fiber architectures of BLSR.

Furthermore, while the invention has been described in terms of switching the traffic in the layer 2/3 pipe through the packet mesh of each node while there is not a failure, a variety of configurations are possible for an optical ring with a layer 2/3 pipe. In a five node ring, a first node may have a layer 2/3 pipe defined over a direct connection to a second node. The first node may also have a layer 2/3 pipe defined over a logical direct connection to a third node through the cross connect of the second node. The first node may also have a layer 2/3 pipe defined over a logical direct connection to a fifth node through the fourth node's cross connect. An optical ring may have 4 nodes which are hybrid network elements and 2 nodes which are TDM only network elements. The TDM only network elements may only act as regenerators between the hybrid network elements. A first hybrid node may have a layer 2/3 pipe defined to a second layer 2/3 pipe through a TDM only node. The first hybrid node may have a layer 2/3 pipe defined to the TDM only node while a another layer 2/3 pipe is defined from the TDM only node to the second hybrid node. These examples are provided to aid in the understanding of the invention and not meant to be limiting upon the invention.

In addition, although the traffic that is passing through a given node (being provided to that node on a span of the ring and being transmitted by that node out another span of the ring) in layer 2/3 pipes may be switched through the packet mesh of that node, the traffic is not considered to be terminated from the ring at that node, but is rather considered to still be on the ring (similar to the manner in which virtual tributaries (VTs) are considered to not be terminated from the ring). However, since each packet is addressed individually, squelching is not needed as with a VT ring.

The method and apparatus of the invention can be practiced with modification and alteration within the spirit and scope of the appended claims. The description is thus to be regarded as illustrative instead of limiting on the invention.

We claim:

1. A computer-readable medium encoded with instructions, which when executed by a set of processors, cause said set of processors to perform operations comprising:
    allocating a pipe from part of a working channel and at least part of a protecting channel of a span of a bi-directional line switched ring (BLSR), the pipe having a bandwidth;
    transmitting a set of layer 2/3 traffic in the pipe; and
    reducing the pipe's bandwidth when a failure occurs in the ring, wherein said set of layer 2/3 traffic is multiplexed with a second set of layer 2/3 traffic while there is a failure and the multiplexed set of layer 2/3 traffic is transmitted in the reduced pipe while there is a failure.

2. The computer-readable medium of claim 1 wherein said set of layer 2/3 traffic is transmitted in the working channel part of the pipe while there is a failure and a third set of Layer 2/3 traffic is transmitted in the remaining protection channel part of the pipe while there is a failure.

3. The computer-readable medium of claim 1 wherein a third set of Layer 2/3 traffic is switched onto the protection channel part of the reduced pipe by BLSR automatic protection switching while there is a failure.

4. The computer-readable medium of claim 1 wherein the working channel and protecting channel comprise a set of timeslots.

5. The computer-readable medium of claim 1 wherein the working channel and protecting channel comprise a set of frequencies.

6. The computer-readable medium of claim 1 wherein the pipe is provisioned on every span of the BLSR.

7. The computer-readable medium of claim 1 further comprising:
    prioritizing the set of layer 2/3 traffic and the second set of layer 2/3 traffic while there is a failure.

8. The computer-readable medium of claim 1 further comprising changing concatenation of the set of layer 2/3 traffic when the failure occurs and when the failure is corrected.

9. The computer-readable medium of claim 1 further comprising allocating a second pipe having a second bandwidth on a second span of the BLSR.

10. A computer-readable medium encoded with instructions, which when executed by a set of processors, cause said set of processors to perform operations comprising:
    allocating a variable rate pipe including a working subpipe from part of a working pipe and a protecting subpipe from part of a protecting pipe of a ring, the working subpipe having a first bandwidth and the protecting subpipe having a second bandwidth;
    transmitting a first set of layer 2/3 traffic in the variable rate pipe by including some of the first set of layer 2/3 traffic in the working subpipe and the remainder in the protecting subpipe;
    protection switching a set of protected traffic into part of the protecting pipe while there is a failure on the ring;

reducing the combined bandwidth of the working subpipe and the protecting subpipe in response to the protection switch;

transmitting the first set of layer 2/3 traffic in only the working subpipe while there is a failure on the BLSR; and transmitting a second set of layer 2/3 traffic that is the set of protected traffic in the protecting pipe while there is a failure on the ring.

11. The computer-readable medium of claim 10 wherein the variable rate protecting pipe utilizes less than all of the protecting pipe while there is not a failure on the ring.

12. The computer-readable medium of claim 10 wherein the second set of layer 2/3 traffic is switched into the variable rate protecting pipe by automatic protection switching.

13. The computer-readable medium of claim 10 wherein the working pipe and protecting pipe comprise a set of timeslots.

14. The computer-readable medium of claim 10 wherein the working pipe and protecting pipe comprise a set of frequencies.

15. The computer-readable medium of claim 10 wherein the variable rate working pipe and the variable rate protecting pipe are provisioned on every span of the ring.

16. The computer-readable medium of claim 10 further comprising changing concatenation of the first and second set of layer 2/3 traffic to transmit said first and second set of layer 2/3 traffic in the variable rate working pipe and variable rate protecting pipe respectively.

17. The computer-readable medium of claim 10 further comprising provisioning a second variable rate working pipe from a second working pipe and a second variable rate protecting pipe from a second protecting pipe of the ring, the second variable rate working pipe having no more than the second bandwidth and the second variable rate protecting pipe having at least the first bandwidth.

18. A computer-readable medium encoded with instructions, which when executed by a set of processors, cause said set of processors to perform operations comprising:

allocating a pipe from part of a working channel and at least part of a protecting channel of a span of a bi-directional line switched ring (BLSR), the pipe having a bandwidth while there is not a failure on the BLSR;

transmitting a set of layer 2/3 traffic in the pipe;

multiplexing said set of layer 2/3 traffic and a second set of layer 2/3 traffic, reducing the pipe's bandwidth when a failure occurs in the ring; and transmitting the multiplexed layer 2/3 traffic in the reduced pipe while there is a failure.

19. The computer-readable medium of claim 18 wherein the working channel and protecting channel comprise a set of timeslots.

20. The computer-readable medium of claim 18 wherein the working channel and protecting channel comprise a set of frequencies.

21. The computer-readable medium of claim 18 wherein the pipe is provisioned on every span of the BLSR.

22. The computer-readable medium of claim 18 further comprising:

prioritizing the set of layer 2/3 traffic and a second set of layer 2/3 traffic.

23. The computer-readable medium of claim 18 further comprising changing concatenation of the set of layer 2/3 traffic to transmit the set of layer 2/3 traffic through the reduced pipe.

24. The computer-readable medium of claim 18 further comprising allocating a second pipe having a second bandwidth on a second span of the BLSR.

25. A computer-readable medium encoded with instructions, which when executed by a set of processors, cause said set of processors to perform operations comprising:

allocating a pipe from part of a working channel and at least part of a protecting channel of a span of a bi-directional line switched ring (BLSR), the pipe having a bandwidth while there is not a failure on the BLSR;

transmitting a first set of layer 2/3 traffic in the pipe while there is not a failure on the BLSR;

reducing the pipe's bandwidth when a failure occurs in the BLSR;

multiplexing said first set of layer 2/3 traffic and a second set of layer 2/3 traffic while there is a failure; and transmitting the multiplexed layer 2/3 traffic in the reduced pipe while there is a failure.

26. The computer-readable medium of claim 25 wherein the working channel and protecting channel comprise a set of timeslots.

27. The computer-readable medium of claim 25 wherein the working channel and protecting channel comprise a set of frequencies.

28. The computer-readable medium of claim 25 wherein the pipe is provisioned on every span of the BLSR.

29. The computer-readable medium of claim 25 further comprising prioritizing the first and second set of layer 2/3 traffic before multiplexing.

30. The computer-readable medium of claim 25 further comprising changing concatenation of the first and second set of layer 2/3 traffic to transmit said first and second set of layer 2/3 traffic through the reduced pipe.

31. The computer-readable medium of claim 25 further comprising allocating a second pipe having a second bandwidth on a second span of the BLSR.

32. A network element comprising:

a control card to detect failures on an optical ring, to reduce a pipe's bandwidth while there is a failure on the optical ring, and to restore the pipe's bandwidth while there is not a failure on the optical ring;

an optical processing circuitry coupled to the control card, the optical processing circuitry to transmit and receive a set of optically switched traffic, the set of optically switched traffic having a set of layer 2/3 traffic; and a layer 2/3 processing circuitry coupled to the optical processing circuitry, the layer 2/3 circuitry to receive a second and third set of layer 2/3 traffic, multiplex the second and third set of layer 2/3 traffic, and transmit the multiplexed set of layer 2/3 traffic to the optical processing circuitry.

33. The network element of claim 32 wherein the optical processing circuitry transmits the set of layer 2/3 traffic in the reduced pipe in response to the control card performs automatic protection switching.

34. The network element of claim 32 further comprising said optical processing circuitry to transmit the set of optically switched traffic through the pipe while there is not a failure in the ring and to transmit the set of optically switched traffic through the reduced pipe while there is a failure in said ring.

35. The network element of claim 32 wherein the layer 2/3 processing circuitry coupled to the optical processing circuitry, the layer 2/3 circuitry to prioritize the second and third set of layer 2/3 traffic, and to multiplex the second and third set of layer 2/3 traffic based on priority.

36. The network element of claim 32 further comprising said control card to direct a first set of layer 2/3 traffic to a first segment of the pipe and a second set of layer 2/3 traffic to a second segment of said pipe.

37. The network element of claim 32 further comprising the control card to reprogram concatenations when failures occur and when failures are corrected.

38. An apparatus comprising:
a control card to detect failures in a ring, to reduce a pipe's bandwidth while there is a failure in the ring, and to restore the pipe's bandwidth while there is not a failure in the ring;
a first processing circuitry coupled to the control card, the first processing circuitry to receive a first set of optically switched traffic and to extract a first set of layer 2/3 traffic from the first set of optically switched traffic;
a second processing circuitry coupled to the first processing circuitry, the second processing circuitry to transmit the extracted first set of layer 2/3 traffic through a packet mesh;
a third processing circuitry coupled to the second processing circuitry, the third processing circuitry to receive the first set of layer 2/3 traffic, process the first set of layer 2/3 traffic, and to transmit the first set of layer 2/3 traffic; and
a fourth processing circuitry coupled to the control card and the third processing circuitry, the fourth processing circuitry to receive the first set of layer 2/3 traffic and transmit the first set of layer 2/3 traffic into the pipe.

39. The apparatus of claim 38 wherein said first and fourth processing circuitry are time division multiplex processing circuitry.

40. The apparatus of claim 38 wherein said first and fourth processing circuitry are wave division multiplex processing circuitry.

41. The apparatus of claim 38 further comprising the control card to protect the first set of layer 2/3 traffic with automatic protection switching.

42. The apparatus of claim 38 further comprising the third processing circuitry to multiplex the first set of layer 2/3 traffic with a second set of layer 2/3 traffic while there is a failure on the ring.

43. The apparatus of claim 38 further comprising the third processing circuitry to prioritize the first set of layer 2/3 traffic and a second set of layer 2/3 traffic and to multiplex the first set of layer 2/3 traffic with the second set of layer 2/3 traffic based on priority while there is a failure on the ring.

44. The apparatus of claim 38 further comprising the control card to reprogram concatenations on the optical third and fourth processing circuitry in response to the ring changing between failure and non-failure states.

45. The apparatus of claim 38 further comprising a second pipe on the ring, said second pipe having a bandwidth different from said pipe.

46. A method comprising:
allocating a pipe from part of a working channel and at least part of a protecting channel of a span of a bi-directional line switched ring (BLSR), the pipe having a bandwidth;
transmitting a set of layer 2/3 traffic in the pipe, wherein said set of layer 2/3 traffic is multiplexed with a second set of Layer 2/3 traffic while there is a failure; and
reducing the pipe's bandwidth when a failure occurs in the ring.

47. The method of claim 46 wherein said set of layer 2/3 traffic is transmitted in the working channel part of the pipe while there is a failure and a second set of Layer 2/3 traffic is transmitted in the remaining protection channel part of the pipe while there is a failure.

48. The method of claim 46 wherein a second set of Layer 2/3 traffic is switched onto the protection channel part of the reduced pipe by BLSR automatic protection switching while there is a failure.

49. The method of claim 46 wherein the working channel and protecting channel comprise a set of timeslots.

50. The method of claim 46 wherein the working channel and protecting channel comprise a set of frequencies.

51. The method of claim of claim 46 wherein the pipe is provisioned on every span of the BLSR.

52. The method of claim 46 further comprising:
prioritizing the set of layer 2/3 traffic and a second set of layer 2/3 traffic while there is a failure.

53. The method of claim 46 further comprising changing concatenation of the set of layer 2/3 traffic when the failure occurs and when the failure is corrected.

54. The method of claim 46 further comprising allocating a second pipe having a second bandwidth on a second span of the BLSR.

55. A computer-readable medium encoded with instructions, which when executed by a set of processors, cause said set of processors to perform operations comprising:
allocating a variable rate pipe from part of a working pipe and at least part of a protecting pipe of a ring, the variable rate pipe having a bandwidth;
transmitting a set of layer 2/3 traffic in the variable rate pipe;
protection switching a set of protected traffic into part of the protecting pipe while there is a failure on the ring; and
reducing the bandwidth of the variable rate pipe when a failure occurs in the ring.

56. The computer-readable medium of claim 55 wherein said set of layer 2/3 traffic is transmitted in the working pipe while there is a failure and a second set of Layer 2/3 traffic is transmitted in the remaining part of the protection pipe while there is a failure.

57. The computer-readable medium of claim 55 wherein said set of layer 2/3 traffic is multiplexed with a second set of Layer 2/3 traffic while there is a failure and the multiplexed set of Layer 2/3 traffic is transmitted in the reduced variable rate pipe while there is a failure.

58. The computer-readable medium of claim 55 wherein a second set of Layer 2/3 traffic is switched onto the protection pipe part of the reduced variable rate pipe by automatic protection switching while there is a failure.

59. The computer-readable medium of claim 55 wherein the working pipe and protecting pipe comprise a set of timeslots.

60. The computer-readable medium of claim 55 wherein the working pipe and protecting pipe comprise a set of frequencies.

61. The computer-readable medium of claim 55 wherein the variable rate pipe is provisioned on every span of the ring.

62. The computer-readable medium of claim 55 further comprising:
prioritizing the set of layer 2/3 traffic and a second set of layer 2/3 traffic while there is a failure;
multiplexing the prioritized set of layer 2/3 traffic and the second set of layer 2/3 traffic; and
transmitting the multiplexed set of layer 2/3 traffic and the second set of layer 2/3 traffic in the reduced variable rate pipe while there is a failure.

* * * * *